(12) United States Patent
Jiang

(10) Patent No.: US 11,897,737 B2
(45) Date of Patent: Feb. 13, 2024

(54) WINCH FITTED WITH PLANETARY GEAR TRANSMISSION HAVING FUNCTION OF AUTOMATIC GEAR SHIFTING

(71) Applicant: Qisheng Jiang, Shandong (CN)

(72) Inventor: Qisheng Jiang, Shandong (CN)

(*) Notice: Subject to any disclaimer, the term of this patent is extended or adjusted under 35 U.S.C. 154(b) by 168 days.

(21) Appl. No.: 17/288,872

(22) PCT Filed: Oct. 22, 2019

(86) PCT No.: PCT/CN2019/112455
§ 371 (c)(1),
(2) Date: Apr. 26, 2021

(87) PCT Pub. No.: WO2020/088303
PCT Pub. Date: May 7, 2020

(65) Prior Publication Data
US 2022/0119234 A1  Apr. 21, 2022

(30) Foreign Application Priority Data
Oct. 30, 2018 (CN) .......................... 201811277448.2

(51) Int. Cl.
*B66D 1/22* (2006.01)
*F16H 57/021* (2012.01)
(Continued)

(52) U.S. Cl.
CPC ............ *B66D 1/225* (2013.01); *F16H 57/021* (2013.01); *F16H 57/043* (2013.01); *F16H 2057/02069* (2013.01)

(58) Field of Classification Search
CPC . B66D 1/22; B66D 1/225; B66D 1/14; B66D 1/24; B66D 1/16; B66D 1/12;
(Continued)

(56) References Cited

U.S. PATENT DOCUMENTS 3,776,518 A * 12/1973 Witwer .................... B66D 1/08
254/344
3,870,255 A * 3/1975 Lemont .................... B66D 1/44
244/137.1

(Continued)

FOREIGN PATENT DOCUMENTS

BG           65510 B1 * 10/2008
CN       102691484 A  *  9/2012
(Continued)

*Primary Examiner* — Michael R Mansen
*Assistant Examiner* — Henrix Soto
(74) *Attorney, Agent, or Firm* — HOUTTEMAN LAW LLC

(57) ABSTRACT

A winch includes a power mechanism motor or a hydraulic motor, a transmission, a winding drum, a brake, a machine frame and a sensor. The transmission, the winding drum, the brake, the machine frame and the sensor are arranged in the winding drum. A driving shaft penetrates through a central hole of a central sun gear of each planetary gear. A clutch gear shifter is arranged between each planetary gear stage, the last planetary gear stage and the winding drum. The clutch gear shifter is connected with a power input side planetary gear rack and a power output side central sun gear during neutral gear. The driving unit drives the execution unit tubular member to move to the right side, and the clutch is disconnected from the connection with the left planetary gear. The right driving shaft power output gear is combined with the central sun gear to complete gear shifting. The empty hook or light-load power mechanism directly drives the winding drum to rotate through the driving shaft.

12 Claims, 15 Drawing Sheets

(51) Int. Cl.
*F16H 57/04* (2010.01)
*F16H 57/02* (2012.01)

(58) Field of Classification Search
CPC ... B66D 1/08; B66D 1/56; B66D 5/08; B66D 5/30; B66D 5/24; B66D 2700/0125; B66D 2700/0133; B66D 2700/0141; B66D 2700/0183; F16H 1/28; F16H 57/021; F16H 57/043; F16H 57/02; F16H 57/0434; F16H 57/08; F16H 57/023; F16H 57/0479; F16H 2057/02069; F16H 3/66; F16H 3/62; F16H 3/46; F16H 61/0204; F16H 2048/207
USPC .......................................................... 254/297
See application file for complete search history.

(56) References Cited

U.S. PATENT DOCUMENTS

| | | | | |
|---|---|---|---|---|
| 4,398,698 A | * | 8/1983 | Crawford | B66D 1/44 254/355 |
| 5,860,635 A | * | 1/1999 | Morfitt | B66D 5/026 254/377 |
| 5,957,803 A | * | 9/1999 | Fini, Jr. | F16H 3/721 475/306 |
| 9,236,781 B2 | * | 1/2016 | White | E21B 19/22 |
| 2002/0171072 A1 | * | 11/2002 | Tso-Kuo | B66D 1/12 254/345 |

FOREIGN PATENT DOCUMENTS

| | | | | |
|---|---|---|---|---|
| CN | 203173725 U | * | 9/2013 | |
| CN | 104555775 A | * | 4/2015 | |
| CN | 107117547 A | * | 9/2017 | |
| WO | WO-2015189368 A2 | * | 12/2015 | B66D 1/50 |

* cited by examiner

WINCH FITTED WITH PLANETARY GEAR TRANSMISSION HAVING FUNCTION OF AUTOMATIC GEAR SHIFTING

TECHNICAL FIELD

The invention relates to a winch provided with an automatic shifting planetary gear transmission, and belongs to the technical field of planetary gear transmissions and winches.

BACKGROUND OF THE INVENTION

A winch used by a mobile crane is basically of a fixed reduction ratio. A hydraulic motor and a hydraulic system can achieve stepped or stepless speed regulation. A plunger type hydraulic motor can achieve speed regulation by changing the angle alpha of a swash plate or controlling the oil distribution plate to move by utilizing a proportional electromagnet to change the oil supply amount, and a low-speed high-torque hydraulic motor can enable the motor to work at high, middle and low speeds by switching part of oil paths through a gear shifting control valve. The speed regulation of large cranes is improved by adopting multi-pump confluence. However, because the variable-speed hydraulic motor is expensive and the variable-speed range is limited. It is time-consuming and energy-consuming when the hoist is in no-load, light-load or with a pulley set, and the hoist with large reduction ratio is in no-load, light-load lifting or traction. It is well-known that when using a movable arm tower crane, the lifting of a standard section is the highest speed judged from the sound of the engine. According to the hoisting capacity of the crane and the hoisting standard knot weight, the hoisting speed is not fast. Because the pulley block steel wire rope multiplying power is large and the speed reduction ratio of the winch is constant, no-load speed-increasing and light-load speed-increasing energy-saving are the keys to be solved.

The power mechanisms such as tower cranes, port cranes and the like mostly adopt motors, and the speed is adjusted by means of frequency conversion or pole changing and the like. The frequency converter can automatically change the frequency to shift according to the size of the load, the light-load fast heavy-load low-speed lifting is realized. Because the speed reducer is constant in speed reduction ratio and the lifting stroke of the tower cranes is large, the motors are output in over-frequency and constant power under the conditions of no load and light load, the speed can be increased but electricity is not saved. The over-frequency is also limited by the maximum linear velocity, noise, vibration and other factors of the high-speed gear of the speed reducer. The constant torque output is below the variable frequency speed regulation power frequency, and the power saving effect is obvious only at low frequency. The pole-changing speed regulation has the advantages of low speed regulation cost, durability and the like and multiple speeds such as two speeds and three speeds can be obtained by adopting single winding three speeds or double winding two speeds and the like. The speed regulation range and light load energy saving are limited due to the constant speed reduction ratio transmission. The hoist with large transmission ratio, such as mine, has the type of shift speed regulation, but its speed range is small and its structure is huge.

At present, as the petroleum resources are increasingly scarce and the air pollution is serious, the electric vehicles, the old-age electric vehicles, the small-sized electric trucks and the like are rapidly popularized. Most of the small-sized electric vehicles sold in the market do not have a transmission or have a small transmission range, and the small-sized electric vehicles are limited in climbing and energy-saving speed increasing, and the torque output of the vehicle transmission is small. A synchronizer and a displacement and rotation speed sensor are arranged in a clutch and a clutch shifter of the planetary gear transmission, so that the problem that an electric vehicle and other mechanisms need to change speed can be solved.

SUMMARY OF THE INVENTION

Aiming at the defects in the prior art, the invention provides a winch provided with an automatic gear-shifting planetary gear transmission, which can change gears according to a lifting load, solves the problem of a large pull trolley of a no-load and light-load crane, reduces friction resistance by preventing the left planetary gear from rotating after the transmission selects a gear, and directly drives the output rotating speed of a winding drum 1:1 through a driving shaft by a no-load and light-load power mechanism. The speed changer provided by the invention has a simple structure and can be used as a speed changer of a small electric automobile and the like after being provided with a synchronizer.

According to the winch with the power mechanism comprising the motor or the hydraulic motor, the planetary gear transmission, the winding drum, the brake, the frame and the sensor, because the driving shaft bearing and the coupler capable of freely rotating for a certain angle are arranged on the left frame, a transition joint is additionally arranged to mount the power mechanism on the left side of the frame through a bolt.

The transmission is mounted in the winding drum to reduce the axial size. The transmission shell with the tapered inner diameter is convenient to mount and dismount an inner mechanism and thoroughly change oil. The outer diameters of the left end and the right end are thickened and provided with a conical or cylindrical reinforcing section I and a reinforcing section II, and the outer diameter of the left reinforcing section I is smaller than that of the right reinforcing section II. The strength of the joint with the rack is increased by the left reinforcing section I, and the upper half part is provided with a plurality of axial grooves, oil pipes for gear shifting, and lubrication and electric control and strong and weak electric circuits are arranged in corresponding holes and grooves of the rack. The strength of the outer gear ring and the bearing of the planetary gear carrier is improved by the right side reinforcing section II. A sealing ring arranged on the right side end cover is conveniently fixed on the shell of the transmission by bolts, and the bearing arranged in the center hole of the right side end cover is combined with the outer diameter of the last stage n-stage planetary gear overhead center output shaft. A bearing combining an inner spline with an outer spline of the driving shaft is arranged between the inner diameter of the planet gear overhead core output shaft and the driving shaft, or a standard bearing is adopted. An inner ring with an inner spline is arranged on an inner ring and is combined with the driving shaft spline. A semi-coupling is arranged on the n-stage planet gear overhead core output shaft to be connected with the winding drum, and a gap between a driving part of the semi-coupling and a driven part is increased so that the hollow output shaft can freely rotate by an angle alpha. The angle alpha is multiplied by the angle of one tooth pitch p of an n-level planetary gear transmission ratio i gt=n-level planetary gear left clutch II. The vertical lifting heavy object gear shifting drum must be stopped and braked, and the angle alpha enables torque-free binding force during gear shifting to easily shift gears.

The left side of the winding drum is arranged on the left reinforcing section I of the transmission shell through a bearing, and the right end cover is connected with the winding drum body through a bolt. The center hole of the right end cover is provided with a bearing to be combined with the hollow support frame, and the hollow support frame is fixed on the right frame through a bolt or a flange with threads. The right frame is connected with the transverse frame assembly and the base through a bolt so as to be convenient to mount and dismount.

A driving shaft provided with an external spline penetrates through a speed changer and penetrates through central holes of all levels of central sun gears. An adjustable center bearing is arranged on the left side and connected with a rack, and the error that the axis of a shell of the speed changer is not perpendicular to the rack is eliminated. A bearing arranged on the right side is arranged in a hollow output shaft and a hollow support frame of an n-level planetary gear, and a coupler is arranged at the end part of the left side and connected with a power mechanism. The clearance between the coupler driving part and the coupler driven part is increased, so that the driving shaft can freely rotate by more than or equal to the angle of one tooth pitch p of the driving shaft power output gear, and the free rotation angle enables no torque binding force during gear shifting. The driving shaft as a transmission shaft mainly bears the torque of a power mechanism and the braking torque of a brake on a right shaft, and the driving shaft can be arranged with equal diameter. The amplified torque after the reduction of the planet gears of each stage is transmitted to the winding drum step by step through the tubular piece of the clutch gear shifter of each stage.

A clutch I is arranged on the left side of the first-stage planetary gear. A gear type clutch, a jaw type clutch or a multi-plate type clutch is arranged on the left side of the first-stage planetary gear, and a sensor is connected with a programmable logic controller (PLC) to realize automatic control.

A planetary gear carrier on the left side of each planetary gear is connected with a central sun gear on the right side through a tubular member of a clutch gear shifter, and the tubular member directly transmits the torque of the planetary gear carrier on the left side to the central sun gear on the right side during neutral gear. A driving unit II of the gear clutch gear shifter is obtained to drive an executing unit tubular member sleeved on a driving shaft to move to the right side, and a left clutch II is separated. A driving shaft power output gear positioned in the tubular member on the right side is meshed with teeth corresponding to the central sun gear for gear shifting, and the driving shaft drives the gear planetary gear to an n-stage planetary gear carrier to drive the winding drum to rotate. The tubular part moves the driving shaft power output gear to the left under the action of the spring force or the driving unit to be combined with the clutch II after being separated from the central sun gear, and then a new gear is changed. A sensor is arranged to be connected with the PLC, the working condition of the gear is monitored, and an instruction is sent to realize automatic gear shifting.

Furthermore, the clutch I is in the form of a gear type, a jaw type, a multi-plate friction type and the like. A ring groove is arranged on a driving shaft from the power input side to mount a limiting elastic retainer ring. A driving shaft power output gear of a thrust bearing is arranged on a shaft shoulder. A spring, a limiting elastic retainer ring, a wear-resistant material washer, a central sun gear, a wear-resistant material washer and a limiting elastic retainer ring are arranged on the shaft shoulder. When the clutch is of a constant combination type, and the spring is arranged on the left side of the power output gear of the driving shaft, the driving unit I pushes or pulls the thrust bearing to enable the clutch to be combined or separated. The power output gear of the driving shaft is provided with tooth profiles according to the structure of the central sun gear, the tooth profiles and the tooth profiles corresponding to the left side of the central sun gear are combined. Two sets of displacement sensors are axially arranged and symmetrically arranged left and right, and one set is used as a supplement or standby to avoid accidents or machine dismantling caused by sensor failure. The displacement sensor is made of a magnetic material, a permanent magnet and a non-magnetic material according to the properties of adjacent materials. An inductive proximity switch, a Hall proximity switch or a capacitive proximity switch is selected. A sensor wire is led out of a machine body to be connected with a PLC to realize automatic control, and a clutch and a sensor support are arranged on an annular support. The annular bracket is fixed in the transmission housing by bolts. When the driving unit is a spring reset type hydraulic cylinder or a pneumatic cylinder, a normally open type multi-plate friction type clutch is arranged. A limiting elastic retainer ring and a thrust bearing are arranged on the driving shaft from left to right. An elastic retainer ring and a circular pressing plate with a convex claw are arranged in the hollow mandrel of the central sun wheel. The convex claw of the pressing plate is positioned in an axial groove of the annular shaft of the central sun wheel and can move axially, and side lines on two sides of the convex claw are parallel. More than or equal to three compression springs installed in round holes at the bottom of the extension axial groove of the annular shaft of the central sun gear are in contact with the pressing plate convex claws. A pin for preventing the bending of the spring is inserted into an inner spring of the extension spring and then the right side of the pin is inserted into a pin hole after the inner spring is compressed. The diameter of an end cap of the pin is equal to the outer diameter of the spring. An inner spline of a driving piece is combined with an outer spline of the driving shaft, and an outer spline or convex claw of a driven piece. A drive unit with a central sun wheel, a wear-resistant material washer, a limiting elastic retainer ring and a spring reset directly drives a thrust bearing to enable a clutch to be combined. A pressure sensor is arranged in an outlet pipeline of an external electromagnetic valve of the drive unit. An alarm is automatically given when the pressure is lower than a set value, and a driver knows the working state of the clutch in a cab according to a display screen, an indicator lamp or an alarm and the like. The extension of the spring is lengthened by increasing the stroke of the pressing plate, and in order to prolong the period of replacing the friction plate, pins are arranged to prevent the lengthened extension spring from bending.

Furthermore, the driving unit of the clutch shifting mechanism is a spring reset type hollow shaft hydraulic cylinder, a hollow shaft pneumatic cylinder, or a hollow shaft electromagnetic drawing switch and a plurality of cylindrical electromagnetic drawing switches.

A hollow shaft spring reset two-way acting type hydraulic cylinder can pull or push a thrust bearing to enable a tubular part to move to the right. When a left clutch is separated, a left No. 1 sensor is connected with a neutral position indicating lamp to be extinguished. A right dead point driving shaft power output gear is moved to be combined with a right central sun gear. A left No. 2 sensor is connected with a present gear indicating lamp to be bright, and a power mechanism is connected. A driving shaft can drive the gear planetary gear to an n-level planetary gear to drive a winding drum to rotate, and a new gear change instruction is obtained. An originally combined gear external electromagnetic valve is subjected to reversing unloading. A spring force and a driving unit drive an execution unit tubular member to move to the left side to be combined with a clutch, and a driving shaft power output gear is separated from a central sun gear. A left No. 2 sensor resets a gear indicating lamp to be extinguished, and a left No. 1 sensor is conducted. When the PLC controls the gear neutral position indicator light to be turned on, the new gear electromagnetic valve conducts the driving unit to act, and the tubular member is driven to move to the right to finish gear shifting. Two sets of displacement sensors are symmetrically arranged on the sensor support in an axial direction. An inductive proximity switch, a Hall proximity switch and a capacitive proximity switch are arranged on the sensor support according to materials close to the sensor support. The sensor is connected with an external PLC. The sensor support and the driving unit are arranged on an annular support, and the annular support is fixed on the inner diameter of a shell of the transmission through bolts.

By adopting the principle of a hollow shaft spring reset single-acting hydraulic cylinder and a double-acting hydraulic cylinder, when the tubular part of the gear execution unit is in contact with or combined with the clutch teeth under the action of spring force, the power output gear of the right driving shaft is separated from the central sun gear and then idles along with the driving shaft, and the sensor switches on the new gear drive unit to complete gear shifting.

The gear shifting principle driven by the annular cylinder is basically the same as above. The gas pressure is lower than the hydraulic pressure, and a piston face with a large area is adopted as a thrust force application side when moving to the right side.

A hollow electromagnetic push-and-pull switch principle and an annular hydraulic cylinder are adopted. Any coil can independently finish push-and-pull work, or a cylindrical pull-and-pull electromagnetic switch is adopted. Gear shifting can be driven by a single coil. The number n is larger than or equal to 2, and the number n is uniformly distributed according to the circumference. A circuit of the pull-and-pull coil is cut off when a movable iron core and a fixed iron core of the annular electromagnetic switch and a movable iron core of the cylindrical electromagnetic switch are controlled by a displacement sensor and a programmable logic controller (PLC). A retaining type electromagnetic pull-up switch can also be used for driving gear shifting. A sensor conducts and cuts off a pull-up coil circuit after a movable iron core is attracted. A magnetic field opposite to an electromagnet is formed by changing the anode and cathode polarities of a coil through a programmable logic controller (PLC) when the iron core needs to return. The iron core returns under the action of a spring, and the defect of the retaining type electromagnetic pull-up switch is that a circuit fault execution unit tubular member can not reset automatically.

Annular pulling claws and pushing claws are arranged at the end part and the inner diameter of the hollow shaft of the driving unit at the two sides of the thrust bearing. A circular push-pull claw is arranged on the cylindrical suction-pull electromagnetic switch, and the pulling claws and the pushing claws are not contacted with the thrust bearing when the gear is in neutral.

Furthermore, the tubular part of the clutch gear shifter execution unit is a tubular part assembly sleeved on the driving shaft. The outer diameter of the left side of the tubular part is provided with a shaft shoulder for mounting a thrust bearing, the left side of the bearing is provided with an elastic retainer ring for limiting the axial movement of the bearing. One end of the spring is arranged to be in contact with the thrust bearing, and the other end of the spring is arranged to be in contact with the right side of the thrust bearing sleeved on the wear-resistant material tubular part and embedded on the planetary gear frame. The left end part and the planet gear carrier are provided with a tooth-embedded or tooth-shaped clutch (the defect that a friction type clutch can be arranged is that large volume is needed to transmit large torque). The right side is provided with an inner spline or an outer spline which is meshed with an outer spline or an inner spline which extends from the left annular shaft of the central sun gear and can slide axially. The inner diameter of the tubular part is sequentially provided with an inner shaft shoulder, a bearing, an elastic retainer ring and a thrust bearing from the left side to the right side. The device comprises a driving shaft power output gear and an elastic retainer ring. The driving shaft power output gear is meshed with teeth corresponding to a central sun gear through end face tooth shapes or tooth cogs. Positioning pins are uniformly distributed on the circumference of a tubular member are inserted into annular grooves on the outer diameter of the power output gear. The tubular member is limited to axially move along with the tubular member, and the tubular member only rotates along with the driving shaft during neutral gear.

The driving shaft power output gear is provided with an inner spline which is meshed with the driving shaft outer spline and can slide axially. The actuating unit tubular member and the driving shaft power output gear move to the right together under the drive of the driving unit. The outer teeth or the tooth cogs are meshed with the inner teeth or the tooth cogs on the left side of the central sun gear to finish gear shifting, and the actuating unit tubular member moves to the time when the left clutch contacts or is combined under the drive of the spring force or the driving unit. The driving shaft power output gear is separated from the central sun gear and then idles along with the driving shaft.

The length of the extension spline of the annular shaft on the left side of the central sun gear is more than or equal to the meshing length calculated by the mechanical structure of the tubular part of the execution unit. The total stroke length, the inner diameter or the end part of the clutch and the power output gear of the driving shaft are provided with inner teeth or tooth cogs which are combined with the outer teeth or tooth cogs of the power output gear of the driving shaft. Conical slope feet are arranged on two sides of the central sun gear. Lubricating oil through holes are uniformly distributed in the centers of the conical slope feet and the polyurethane sponge or other oil-resistant oil-retaining material with holes for foaming is arranged in the space between the right tapered slope foot and the tubular part of the execution unit. The inner diameter of the center hole is provided with a needle roller bearing combined with an inner spline of the inner ring and an outer spline of the driving shaft, a sliding bearing or a floating mounting sliding bearing, and the left side and the right side are respectively provided with a wear-resistant material gasket and an elastic retainer ring for limiting. The central sun wheel idles around the driving shaft, and after the teeth of the driving shaft power output gear are combined with the corresponding teeth of the central sun wheel, the driving shaft drives the central sun wheel to rotate through the power output gear to gradually reduce the speed to the output torque of the winding drum.

Furthermore, a section of free stroke is arranged between the teeth of the driving shaft power output gear of the clutch gear shifter and the corresponding teeth of the central sun gear. The length of the free stroke is greater than the meshing length of the clutch teeth or the meshing length of the driving shaft power output gear and the central sun gear. When the two lengths are large, the execution unit tubular piece moves to the left side to be in contact with the clutch teeth, and the execution unit tubular piece does not need to be meshed exactly. The free stroke ensures that the driving shaft power output gear and the central sun gear are completely separated when the clutch teeth are in contact. When the current combined gear is on the right side of the new gear, the driving shaft drives the new gear to enable the planetary gear carrier of the current gear to rotate, and the clutch teeth are automatically combined under the action of spring force when corresponding. When the current gear is on the left side of the new unit, the driving shaft directly drives the planetary gear of the new gear to the drum to rotate. When the bidirectional driving unit is arranged, gear shifting can be forcedly pushed. According to the prior art, the tooth tip can be arranged into a sharp angle or an arc shape. The tooth side is provided with a slope foot of less than 2-8 degrees. The backlash is increased and the like. The free stroke is not arranged, and the free stroke is reduced clutch clearance.

Furthermore, oil drainage holes are uniformly distributed on the lower half parts of the outer diameters of the inner gear rings of the planetary gears at all levels in the transmission shell with the tapered inner diameters at intervals. Notches with equal heights as radiuses are axially cut from the outer diameters of the inner gear rings on the two sides with the same arc as the oil drainage holes. An oil drainage hole is arranged at the bottom of the right side of the transmission shell, and the oil drainage hole is plugged by a threaded plug. A breather and an oil filling hole are arranged at the top corresponding to the oil drainage hole. Oil changing holes are formed in the positions, corresponding to the oil drainage holes and the breather of the winding drum, so that oil can be filled and thoroughly changed.

An oil exchange pipe with a visible oil level height is arranged at the bottom of the power mechanism on the left side of the rack. The oil exchange pipe is arranged in an arc shape and is equidistantly arranged along with the outer diameter of the transition joint. A T-shaped short pipe of the oil exchange pipe is connected with an oil pipe led out from the machine body through a loose joint or a quick joint. The upper part or the middle part of the oil exchange pipe is provided with a positioning clamp for fixing the oil exchange pipe. The upper part and the lower part of the oil exchange pipe are provided with threaded end covers.

When the selected gear works, a planetary gear on the left side does not rotate, so that a central sun gear bearing on the left side and a bearing in an execution unit or a wet multi-disc clutch are poor in lubrication, and the service life of the transmission is affected. A forced lubrication system is arranged outside the machine body. A hollow three-way joint is arranged at the bottom of an oil inlet pipe and an oil outlet pipe led out from the machine body and connected with an oil suction pipe. An oil filter with a bypass is connected with a hydraulic pump to filter part of impurities in lubricating oil. An overflow valve, a pressure sensor and a flow sensor are arranged in a lubricating oil pipe connected with an outlet of the hydraulic pump. Oil discharged from the overflow valve directly flows to an oil suction pipe through an oil return pipe to enter recirculation, and a driver can master the working condition of a lubricating system at any time through the pressure and the flow sensor. A lubricating oil pipe enters the upper half part of a transmission shell from a left rack hole through an axial groove formed in the transmission shell. A branch oil pipe is introduced into the upper part of the transmission shell through a hole formed in the upper part of each stage of planetary gear. A central sun gear bearing of the planetary gear is directly lubricated. A hydraulic pump is controlled by a PLC (programmable Logic Controller). The hydraulic pump can not work when a driving shaft drives a primary planetary gear to work. The hydraulic pump can work intermittently under a normal working condition, and working with long service life under the condition of achieving the purpose of lubrication.

An oil level sensor, a display screen, an indicator lamp in a cab and an alarm that can indicate the oil level and the pollution degree of lubricating oil are arranged in the shell of the transmission.

Furthermore, a clutch gear shifter is arranged between the n-stage planetary gear carrier and the winding drum. The power mechanism directly drives the winding drum to rotate through the driving shaft when the rope winding multiplying power a of the movable pulley of the no-load, light-load or sub-heavy-load pulley block is more than or equal to 6. The outer diameter of the tubular member is provided with an outer spline which is combined with an inner spline of a bearing inner ring of a right end cover of the transmission, and the bearing can also be provided with a sliding bearing. The tubular member of the actuating unit can axially slide in the bearing during gear shifting, and the left side of the central tubular member of the half coupling provided with the outer spline is combined with the inner spline of the tubular member of the actuating unit. The tubular member can axially slide, and the right side of the central tubular member of the half coupling is in interference fit with the inner spline of the driving member of the two bearings with internal splines are arranged on the inner diameter and are combined with the driving shaft. A cogged tooth or a cogged tooth which corresponds to a power output gear of the driving shaft is arranged at the end part of the left side of the driving shaft in a dynamic mode. A half-coupling pressing plate is fixed on the left side of the driven member through a bolt to limit the axial movement of the driving member, and the gap between the half-coupling driving member and the driven member is increased. Therefore, the tubular member of the execution unit at the left side of the n-stage planetary gear can freely rotate by the angle of the tooth pitch p of the clutch, the gear shifting is easy and convenient, and the half-coupling driven member is fixed at the center position inside the winding drum through a bolt. A gear shifting instruction is obtained. The driving unit drives the tubular member of the executing unit to move towards the right side. The left clutch is separated. The teeth of the power output gear of the right driving shaft are combined with the corresponding teeth of the central tubular member of the half-coupling, and the driving shaft directly drives the winding drum to rotate so as to increase speed and save energy.

Furthermore, the two sides of the winding drum are respectively provided with a brake, and the brake can be in the form of a caliper disc type, a belt type or a clasping block type and the like. One of the brakes is normally closed and the power mechanism stops rotating. When no-load rapid descending or other braking cooperation is needed, a pedal with a sensor is operated and braked by a manual pedal, and the pedal is locked to be in a braking state when the pedal stops working, so that a double safety function can be achieved. A normally open type brake in the form of a disc and the like is arranged at the extending end part of the right shaft of the driving shaft. The drum can stop rotating by directly braking a small braking torque of the driving shaft.

The end face of the winding drum is provided with a permanent magnet, a concave-convex tooth or a grating. Two paths of Hall sensors, photoelectric sensors and the like are arranged. One path of sensors records the number of positive and negative rotations of the winding drum, and the maximum rope outlet, the upper limit and the lower limit of the hook can be set for alarm and stop limitation. The other path detects the rotating speed of the winding drum. The rotating speed of the winding drum exceeds a set value. The sensor controls a normally open brake to brake through a microcomputer and a PLC, so that the winding drum is reduced in speed or stops rotating.

Furthermore, the empty hook descends and presses the empty hook descending switch to enable the clutch I and the clutch gear shifter to be in a neutral position. The motor or the hydraulic motor rotates, and the normally-closed brake opening reel can freely rotate. The empty hook can rapidly descend under the brake of the normally-open brake. The power mechanism stops rotating the normally-closed brake to brake, and the safety problem of empty hook descending is solved. The first-stage clutch I of the transmission adopts a normally open multi-plate friction type, and the clutch is combined before the empty hook is close to an appointed position. The other tooth type clutch I multiplies the speed reduction ratio of the gear to the drum according to the rotating speed of the drum. The microcomputer controls the power mechanism to speed up the main clutch and the driven member of the clutch to be combined synchronously according to the rotating speed detected by the rotating speed sensor. The drum is gradually decelerated due to the regenerative power generation braking state of the motor. The regenerated electric energy is an electric automobile old battery energy storage battery pack or a super-energy capacitor storage part which is arranged in a counterweight piece made of crane metal. The rest of the electric automobile old battery energy storage battery pack or the super-energy capacitor storage part is consumed by a brake resistor, and the brake matching safety of a normally open brake is guaranteed. When the power mechanism is driven by a hydraulic motor, the hydraulic motor is provided with a brake, and the functions of throttling speed regulation, volume speed regulation and the like of a hydraulic system are used for assisting braking. The sensor (6) is fixed on the frame (5) and is connected with a microcomputer and a PLC (programmable Logic Controller), so that the braking of the winch is controlled manually or automatically.

Furthermore, the winch provided with the automatic shifting planetary gear transmission is used as a transmission of an electric automobile, a light electric truck and the like. The synchronizer I is arranged on the left side of the tubular member, and the synchronizer II is arranged on the right side of the tubular member. The synchronizer I is combined to transmit the torque of the left planetary gear carrier to the right central sun gear through the tubular member in a normal state. The spline hub I inner hole of the synchronizer I is provided with a bearing and is connected with the driving shaft. A needle roller or a sliding bearing is arranged on the outer diameter of the right annular shaft and is combined with the inner diameter of the tubular part to reduce the radial runout of the tubular part. The inner spline of the spline hub II of the synchronizer II is meshed with the outer spline of the driving shaft, and wear-resistant material gaskets and elastic check rings are arranged on the two sides of the spline hubs I and II to limit axial displacement.

An inner tooth is arranged on the inner diameter of the left side of the tubular part and serves as a joint sleeve I to be meshed with the outer tooth of the spline hub I. The inner tooth is meshed with the outer tooth of the lock ring I and the outer tooth of the joint gear ring I in a sliding mode. An upper groove is arranged at the position of the sliding block I. The left slope foot and the right slope foot are respectively combined with a positioning pin. A shaft shoulder is arranged on the outer diameter of the tubular part. An elastic retainer ring is arranged on the left side of the thrust bearing. The right side of the tubular member is in contact with a thrust bearing or a wear-resistant material washer at the planet gear carrier. A positioning pin at the right half part of the tubular member is inserted into a ring groove II of a coupling sleeve II arranged in the tubular member, so that the coupling sleeve II and the coupling sleeve I synchronously axially move. A spline at the right side of the tubular member is combined with a central sun gear annular shaft extension spline. The length of the spline is not less than the total stroke length of the synchronizer I and the synchronizer II and the combined length is calculated by a structure.

A joint gear ring I, a conical surface I, a disc spring combined with the conical surface I, a single-cone or three-cone locking ring I and a spline hub I are arranged at the right axial direction of the center hole of the right sheet of the planetary gear carrier. A joint gear ring II, a conical surface II, a disc spring connected with the conical surface II, a lock ring II and a spline hub II are arranged on the annular shaft extension end surface or the left side end surface of the central sun gear from right to left. Inner teeth of the joint sleeve II are meshed with outer teeth of the spline hub II constantly and can slide axially and are combined with outer teeth of the lock ring II and the joint gear ring II in a sliding mode.

A displacement sensor is arranged on a sensor support on the left side of the driving unit II, and a permanent magnet is arranged at the position, corresponding to the rotating speed sensor, of each planetary gear carrier. The displacement sensor and the rotating speed sensor are connected with a transmission controller TCU, and the transmission controller TCU and a motor controller MCU are controlled by an electric automobile vehicle controller VCU. An instruction is sent according to output torque and throttle feedback information. The original combined gear driving unit drives the tubular member to move to the left to the neutral gear position, and the synchronizer II delaying to the new gear is combined with the original gear synchronizer I to finish automatic gear shifting.

Furthermore, the outer diameter of the planetary gear carrier of the speed changer is not provided with a bearing which is combined with a shell of the speed changer. The left end of the annular shaft extension of the central sun gear is provided with a bearing which is combined with a gear ring II and a conical surface II. The inner diameter of the left sheet of the planetary gear carrier is provided with an inner ring inner spline. The bearing is combined with the annular shaft extension outer spline, and the left side of the planetary gear carrier is provided with an elastic retainer ring to limit displacement. A bearing is arranged on the inner diameter of a right sheet of the planetary gear carrier and is combined with a conical slope foot plane on the right side of the central sun gear. An elastic retainer ring is arranged on the right side of the bearing for limiting.

The spline on the right side of the tubular piece, which is axially arranged from the left side end face of the central sun gear to the left side and is connected with the gear ring II and the conical surface II, is provided with an outer spline which is combined with an inner spline extending from the annular shaft of the central sun gear and can axially slide. A bearing is arranged on the inner diameter of the left piece of the planetary gear carrier and is combined with the outer diameter extending from the annular shaft of the central sun gear. The left side of the planetary gear carrier is limited by an elastic retainer ring. The inner diameter of the right plate of the planetary gear carrier is provided with a bearing which is combined with a slope foot plane on the right side of the central sun gear, and the right side of the planetary gear carrier is provided with an elastic retainer ring for limiting.

A disc spring is arranged between a lock ring and a joint gear ring of the synchronizer I or the synchronizer II, so that when the synchronizer is not combined, friction pieces do not contact or less contact, and friction combination or sintering is avoided. The outer diameter of the disc spring is in contact with a recessed step on the side face of the lock ring, and the inner diameter of the disc spring is in contact with the intersection of a conical surface and a joint gear ring vertical surface. The three-cone synchronizer is arranged in a mode that the middle steel ring convex claw is connected with the joint gear ring. The outer diameter of the butterfly spring is in contact with the recessed step on the side face of the lock ring, and the inner diameter is in contact with the intersection of the middle steel ring and the joint gear ring vertical face. The radial runout of the synchronizer of the automobile transmission is slightly influenced when the synchronizer of the automobile transmission is arranged on the coaxial shaft in a short distance, and the non-concentricity and the radial runout are easily increased due to factors such as the structure of the patent, the machining and the installation of parts and the like. The disc spring can eliminate the influence of the errors.

Furthermore, a synchronizer I is arranged between the right plate of the n-stage planetary gear of the speed changer and the tubular piece for connection. A thrust bearing is arranged on the outer diameter of the left side of the tubular piece. The left side of the spring is in contact with the thrust bearing, and the right side of the spring is in contact with a thrust bearing on the left side of the planetary gear carrier or a wear-resistant material gasket. An outer spline arranged on the outer diameter of the right side of the tubular piece meshed with an inner spline of a center bearing of a right end cover of the speed changer and an optical shaft can also be arranged to be combined with a sliding bearing of a right end cover of the transmission and can axially slide. A power output spline is arranged on the right side of the tubular member. A pin arranged on the tubular member is inserted into a groove of a joint sleeve II. A synchronizer II driven member is arranged on the right side of a spline hub II. A joint gear ring II, a conical surface II, a disc spring connected with the conical surface II, a lock ring II and a spline hub II are arranged on the driven member from right to left, and the joint sleeve II is meshed with the spline hub II. The center hole of the driven member is provided with a needle roller bearing or a sliding bearing with an inner spline in the inner ring. The needle roller bearing or the sliding bearing is combined with the driving shaft. The two sides of the driven member are provided with wear-resistant material washers. The elastic retainer rings are positioned on the driving shaft.

The outer diameter of the elastic retainer rings is provided with an outer spline, and the outer spline is in clearance fit with the right side spline of the tubular member. The right side of the follower of the synchronizer II is provided with an inner end cover and is positioned by an elastic retainer ring. An optical axis part without a spline at the right end part of the driving shaft is combined with an oil seal of the inner end cover; and a sensor is arranged on the right end cover of the transmission. A rotating speed sensor is arranged on the support.

The driving unit drives the tubular piece to move the left synchronizer I to the right side to be separated. The joint sleeve of the right synchronizer II drives the positioning pin. The sliding block pushes the locking ring II to be combined with the conical surface II. The inner teeth of the joint sleeve II are meshed with the outer teeth of the combined gear ring II after the rotating speed of the driving shaft and the tubular piece are synchronous. The positioning pins of the synchronizers I and II fall into the left side slope feet to be locked, and the power mechanism drives the tubular piece to directly output torque through the driving shaft. The driving unit drives the tubular member to move the synchronizer I to be combined to the left. Meanwhile, the combining sleeve of the synchronizer II is separated from the joint gear ring. The positioning pins of the two synchronizers fall into the right slope feet to be locked, and the driving shaft drives the selected gear planetary gear to the n-level planetary gear to output torque through the tubular member.

The invention has the beneficial effects that:
(1) compared with the prior art, the gear shifting device has the advantages that the clutch gear shifter is arranged between the last-stage n-stage planetary gear and the winding drum through gear shifting and empty hook light loading according to the ascending, descending and load sizes. The power mechanism directly drives the winding drum to rotate, and the transmission ratio is changed to eliminate the phenomenon of a large pull trolley. A driver shifts gears according to the lifting weight data displayed by the display screen and the gear shifting calculated according to the lifting capacity parameters of the crane. According to the data collected by the weight measuring unit and the lifting weight of each transmission ratio, the economical lifting range of each gear is calculated and programmed by a crane microcomputer, so that automatic gear shifting can be realized. Taking the three-stage planetary gear belt to directly drive the drum to rotate speed-changing as an example, the motor or hydraulic motor directly drives the drum to rotate through the drive shaft under no-load and light-load conditions, and the light load is converted to n-stage planetary gear single-stage speed reduction. The electricity is saved by about 40%-70%. The secondary heavy load is similar, and the heavy load speed reduction ratio is the same without electricity saving. The low-speed high-torque hydraulic motor is adopted, and the power of the configured hydraulic motor can be reduced through gear shifting and speed changing. The drum is directly driven to rotate under no load and light load through the driving shaft, and rapid lifting can be completed by outputting less hydraulic oil. The energy-saving effect is also remarkable. According to the invention, the energy is saved, the working efficiency can be improved, the average time of one hoisting time can be reduced, the construction period can be shortened, the mechanical work shift can be saved, and the construction cost can be reduced.

(2) The variable-pole variable-speed motor is applied to a variable-pole variable-speed motor. Taking two to three speeds of the motor as an example, the variable-speed motor can output 8 to 12 speeds through four-gear calculation, and the gear is selected according to the load and the rotating speed of the motor, so that the efficiency of the asynchronous motor can be improved when the asynchronous motor is operated near a rated working point. The energy-saving and speed-increasing effects are obvious, and the variable-frequency variable-speed motor is free of energy saving.

(3) An example of energy saving and speed increasing calculation is provided. Taking the specification data of Zhonglian Zhongke 7052-25 tower crane as an example: the speed ratio of 4-pole motor and reducer is about 1420 r/min when the motor speed of lifting mechanism is 6.3 kw and the speed is 713 r/min (35 Hz): 33.97. The drum speed (r/min) is 62, and the maximum linear speed of the wire rope is 160 m/min. The constant power frequency variable frequency speed regulation mode is adopted. According to the above data, when the maximum rope speed is 160 m/min, the motor speed is 62*33.97=2106 r/min and the over frequency is 2106/713-1=195%.

Energy saving estimation of constant torque output: according to GB 12497 "Three-phase asynchronous motor economic operation" mandatory national standard implementation supervision guide, "2, constant torque load speed regulation energy-saving, constant speed load: PL=TLn 1/9550 (3), the input power of the motor is proportional to the first power of the speed, and the power saved by the variable frequency speed control can be calculated by the following formula: Ki=(P1–P2)/P1=(n1–n2)/n1 (4), (P1–P2)=(T1n1–T2n2)/9550=T (n1–n2)/9550 (5), the power saved is proportional to the speed difference of the system speed regulation, the larger the speed difference is, the more obvious the energy saving is".

No-load power saving rate estimation: when the rotating speed n1 of the motor is set to be 100,400 and 713 r/min, the rotating speed n2 of the drum directly driven by the no-load motor is set to be 100/33.97, 400/33.97 and 713/33.97, and the power saving rate is calculated: Ki=(n1–n2)/n1=(n1100–n2100/33.97)/n1100*100/%=97%, Ki=(n1400–n2400/33.97)/n1400*100/%=97%; Ki=(n 1713–n 2713/33.97)/n 1713*100/%=9.7%, proving that formula (4) and the following explanation of formula (5), "the saved power is proportional to the speed difference of the system speed regulation, the larger the speed difference is, the more obvious the energy saving", are consistent with the actual calculation.

estimation of light load power saving: setting a three-stage planetary gear reduction ratio i=3.539*3.2*3=33.97, wherein the maximum constant torque rotating speed is 713*3/33.97=6.3 r/min, and the power saving rate Ki=(n1–n2)/n1=(n 1713–n 263)/n 1713*100/%=9.1%.

Sub-heavy load power saving estimation: 713*3*3.2/33.97=202 r/min, power saving rate Ki=(n1–n2)/n1=(n 1713–n 2202)/n 1713*100/%=71%.

Heavy load power saving estimation: because the gear ratios are the same, no power is saved according to the formula comparison.

Energy Saving Estimation of Constant Power Output: The rope outlet speed of the winch with the no-load motor rotating speed of 6.2 r/min reaches 160 m/min, and all are in a constant torque range. The rotating speed of the light-load motor is 3*6 lt2 gt=186 r/min, and the rope outlet speed can reach 160 m/min, so that all the rope outlet speeds are in a constant torque range. According to the invention, the rotating speed of the secondary heavy-load motor is 3*3.2*6 2=595.2 r/min, the rope outlet speed can reach 160 m/min, and the rope outlet speed is all in a constant torque range; according to the invention. The rotating speed of the heavy-duty motor is less than or equal to 713/33.97=2 lr/min (the rotating speed of the winding drum) and is the constant torque output. When the rotating speed of the winding drum is more than or equal to 2 lr/min, the rotating speed of the motor is more than or equal to 713 r/min and is the constant power output, and the motor mainly works in the constant torque range, so that the electricity-saving effect is very remarkable.

When the multiplying power of the steel wire rope of the movable pulley is a=4 or a gt=6, the energy-saving advantage of low-frequency operation of the movable pulley can be more displayed. The internal power consumption of the frequency converter is deducted to be about 5%. The working proportion of the crane in no-load and light load is larger. The comprehensive estimation of the power saving rate is more than 30%-40/%, and the power saving rate is more than 40% if the empty hook is matched with a normally-open brake and a multi-plate friction clutch of the first-stage Calculation of Energy Saving and Speed Increasing of Hydraulic Motor.

(4) According to the analysis of "the development trend of internal climbing tower crane in Japan", the highest lifting speed of the tower crane is 121~160 m/min in Japan's high-lift (above 250 m), but the higher the speed is, the higher the speed is, the higher the speed is, 200~300 m/min is suitable for high speed production. The high speed is generally suitable for no-load or light load, the rope discharging is estimated according to 2 m/r, the rotating speed of the motor is 300 r/min when the steel wire rope multiplying power a of 300 m/min is 2, and the rotating speed of the motor is 600 r/min when the steel wire rope multiplying power a the rotating speed of the motor is equal to 600 r/min.

(5) The transmission is simple in structure, and can be applied to electric automobiles and small electric wagons, and is used for a car and can be provided with a rear motor. The transmission is connected with a transfer case through a hollow output shaft. The transfer case is normally connected with a front drive axle to drive front wheels to run, and the road surface condition is poor to drive four wheels of the front drive axle and the rear drive axle. A motor used for a small truck directly drives a rear drive axle through a speed changer to drive the automobile to run. A microcomputer is utilized to select an appropriate transmission ratio according to required torque and speed requirements, so that the electric automobile runs in a high-efficiency range, loads of a motor and a power supply are reduced, and power loss is reduced.

BRIEF DESCRIPTION OF THE DRAWINGS

FIG. 1 (b) is a left side view of FIG. 1 (a).

FIG. 3 (b) is a schematic view showing the engagement of the inner teeth and the inner and outer teeth of the clutch I in Embodiment 4.

FIG. 3 (c) is a schematic view showing the combination of outer teeth and inner teeth of the clutch I in Embodiment 4.

FIG. 6 (b) is a sectional view A-A of FIG. 6 (a).

FIG. 7 (b) is a cross-sectional view B-B of FIG. 7 (a).

FIG. 8 (b) is a schematic view showing that the left end face of the center sun gear of the transmission is provided with the engaging ring gear in Embodiment 5.

FIG. 8 (c) is a schematic view showing that a synchronizer and a power take-off shaft are provided on the right side of the n-stage planetary gear of the transmission in Embodiment 5.

Figure 1:
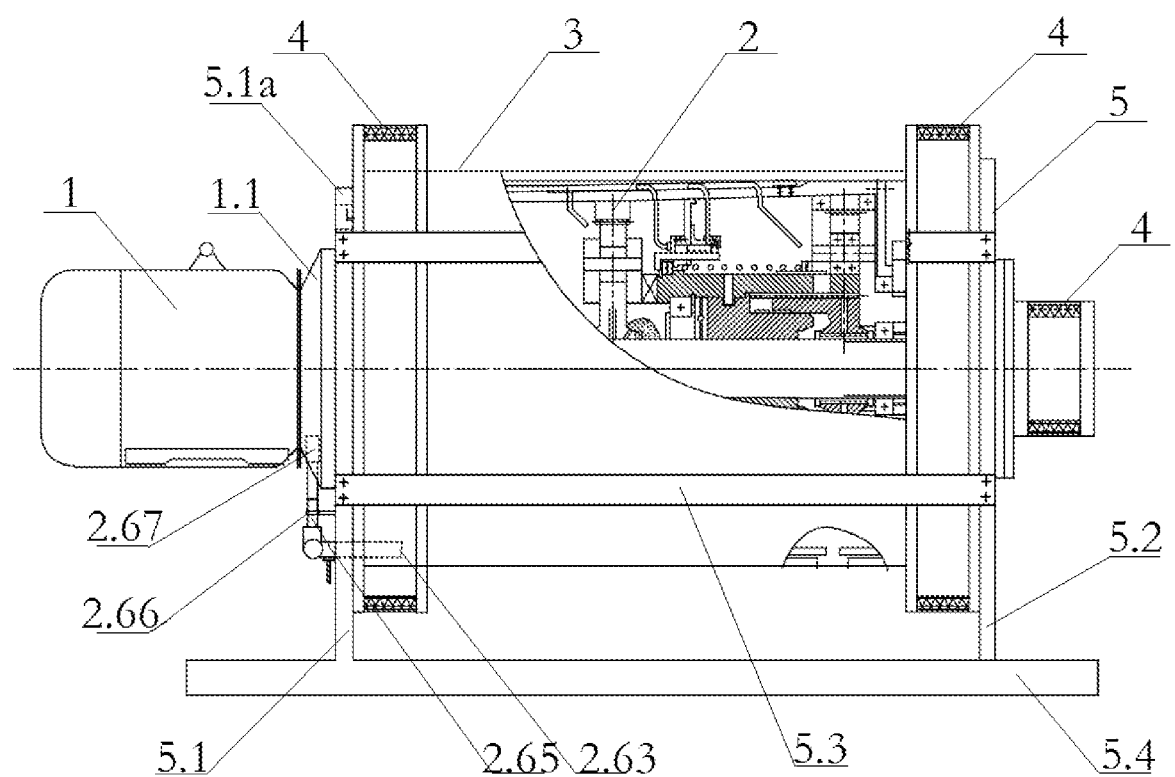
FIG. 1 (a) is a schematic view of an automatic shift transmission hoist in Embodiment 1.
Figure 1:
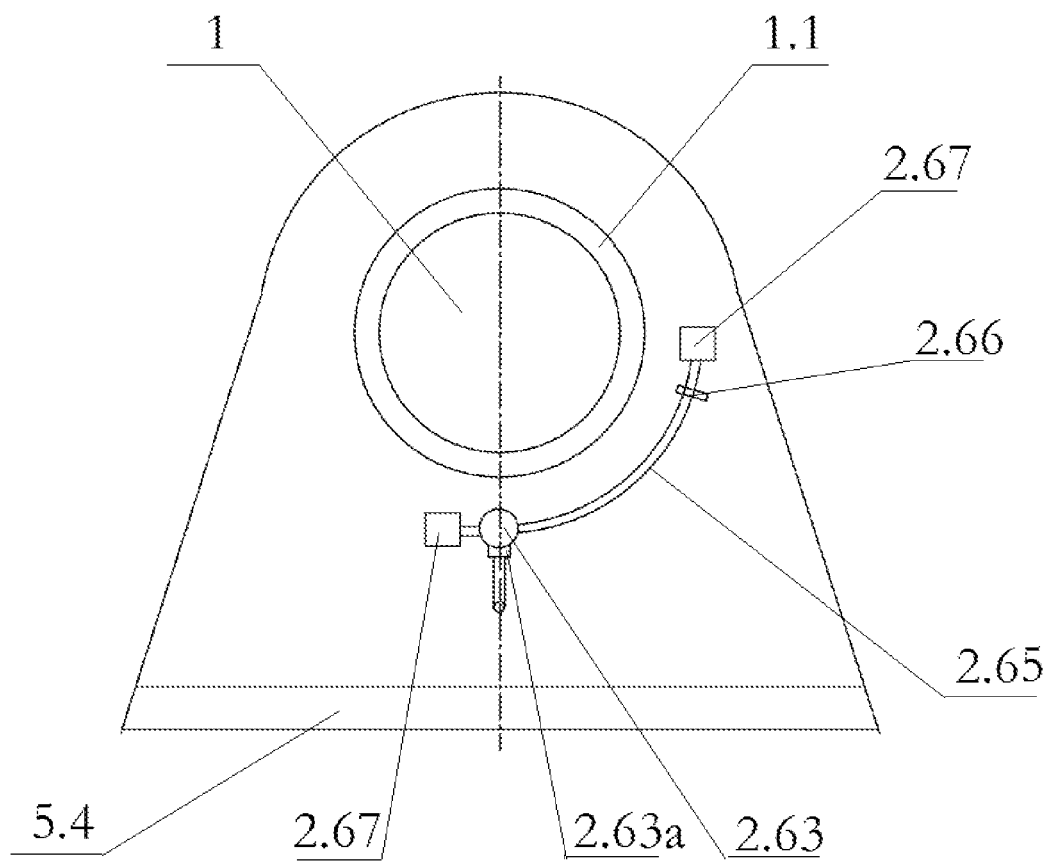

In the Figures: 1, Power mechanism; 1.1, transition section; 1.2, Coupling; 1.21, Coupling driving part; 1.22, Coupling follower;

2, Transmission; 2.1, Transmission case; 2.1 *a*, reinforcing section I; 2.1 *a* 1, axial groove; 2.1 *b*, reinforcing section II; 2.1*c*, right end cover; 2.2, 1-*n* planetary gear; 2.2*a* central sun gear; 2.2*a* 1. Central hole of central sun gear; 2.2*a*11, tapered slope foot; 2.2*a*12, lubricating oil through hole; 2.2*a*13 conical slope foot plane; 2.2*a*2. Annular shaft extension; 2.2*a* 21 annular shaft extension spline; 2.2*a* 22 annular shaft extending axial groove; 2.2*a* 23, bottom round hole; 2.2*a* 24 Pin holes; 2.2*a* 25 Internal spline or groove; 2.2*a* 26. Tooth or cog II; 2. and 2*b*, a planetary gear carrier; 2.2*b* 1 hollow output shaft; 2. and 2*c*, an outer gear ring; 2.2*c* 1, oil discharging hole; 2.3, Driving shaft; 2.31, External spline of driving shaft; 2.3*a*, driving shaft power output gear; 2.3*a* 1. Tooth or cog I; 2.3*a* 2, outer diameter ring groove; 2.3*a* 3. Internal spline of power take-off gear; 2.4, Clutch I; 2.4*a* drive unit I; 2.4*b* execution unit; 2.4*b* 1, annular pressing plate; 2.4*b* 2. Pin; 2.4*b* 3. driving plate; 2.4*b* 4. Driven sheet; 2.5, Clutch gear shifter; 2.5*a* drive unit II; 2.5*a* 1, pulling claw; 2.5*a* 2. Pushing claw; 2.5 *a* 3, circular pulling claw; 2. and 5*b*, a clutch gear shifter execution unit tubular member; 2.5*b* 1, left clutch II; 2.5*b* 2. shoulder; 2.5*b* 3. Wear resistant ring; 2.5*b* 4, right spline of tubular part; 2.5*b* 5. Positioning pin; 2.5*b* 6. External spline combined with bearing; 2.5*b* 7. Internal end cap; 2.6, Lubrication system; 2.61, Oil drain hole; 2.62, Ventilator and oil filling hole; 2.63, Oil inlet and outlet pipe; 2.63*a*. Hollow pipe joint; 2. and 6, 3*b*, an oil suction pipe; 2. and 6, 3*c*, an engine oil filter; 2.63*d*, lubricating oil pipe; 2.63*e* hydraulic pump; 2.63*f* overflow valve; 2.64, Loose joint or quick joint; 2.65, Oil changing pipe; 2.66, Positioning card; 2.67, Threaded end cap; 2.68, Oil-retaining material; 2.7, Semi-coupling; 2.71, Central tubular member; 2.711, Tooth or cog III; 2.712, External spline for central tubular member; 2.72, Driving part; 2.73, Driven member; 2.74, Pressing plate; 2.8, Ring-shaped support frame;

3, Reel; 3.1, Rope winding part cylinder; 3.2, Right end cap; 3.3, Oil changing hole; 3.4, Permanent magnet, concave-convex tooth or grating;

4, Brake; 4.1, Normally closed brake; 4.2, Reel normally open brake; 4.3, Driving shaft normally open type brake;

5, Rack; 5.1*a*, rack hole; 5.2, Right Rack; 5.2*a*, hollow support frame; 5.3, Frame cross assembly; 5.4, Base;

6, Sensor; 6.1, Sensor support; 6.2, Displacement sensor; 6.3, Pressure sensor; 6.4, Flow sensor; 6.5, Oil level sensor; 6.6, Turn sensor; 6.7, Rotating speed sensor;

7, Bearing; 7*a* thrust bearing; 7*b*. Sliding bearing; 7*c* needle bearing;

8, Wear-resistant material washer;

9, Elastic check ring;

10, Spring; 10.1, Disk spring;

11, Synchronizer I; 11.1, Engaging sleeve I; 11.11, and an inner tooth of the joint sleeve I; 11.12, and a middle groove I; 11.13 groove I left slope foot; 11.14, Right slope foot of groove I; 11.2, Spline hub I; 11.21, spline hub I inner hole; 11.3, slider I; 11.4 dowel pin I; 11.5 Lock ring I; 11.51 Lock ring I side recessed step; 11.6, Cone I; 11.7, A ring gear I is engaged;

12, Synchronizer II; 12.1, Coupling sleeve II; 12.11, Joint sleeve II internal tooth; 12.12, and a middle groove II; 12.13, Groove II left slope foot; 12.14, Groove II right slope foot; 12.15, Joint sleeve II ring groove; 12.2, Spline hub II; 12.21, Spline hub II external tooth; 12.22, Spline hub II internal spline; 12.3, slider 11; 12.4 dowel pin II; 12.5 Lock ring II; 12.51 Lock ring II side recessed step; 12.6, Cone II; 12.7, A ring gear II is engaged; 12.8, II follower of synchronizer; 12.81, Outer spline of follower of synchronizer II.

DETAILED DESCRIPTION OF THE INVENTION

In order that the objects of the present invention will be more clearly understood, the present invention will now be described in further detail with reference to examples.

Figure 2:
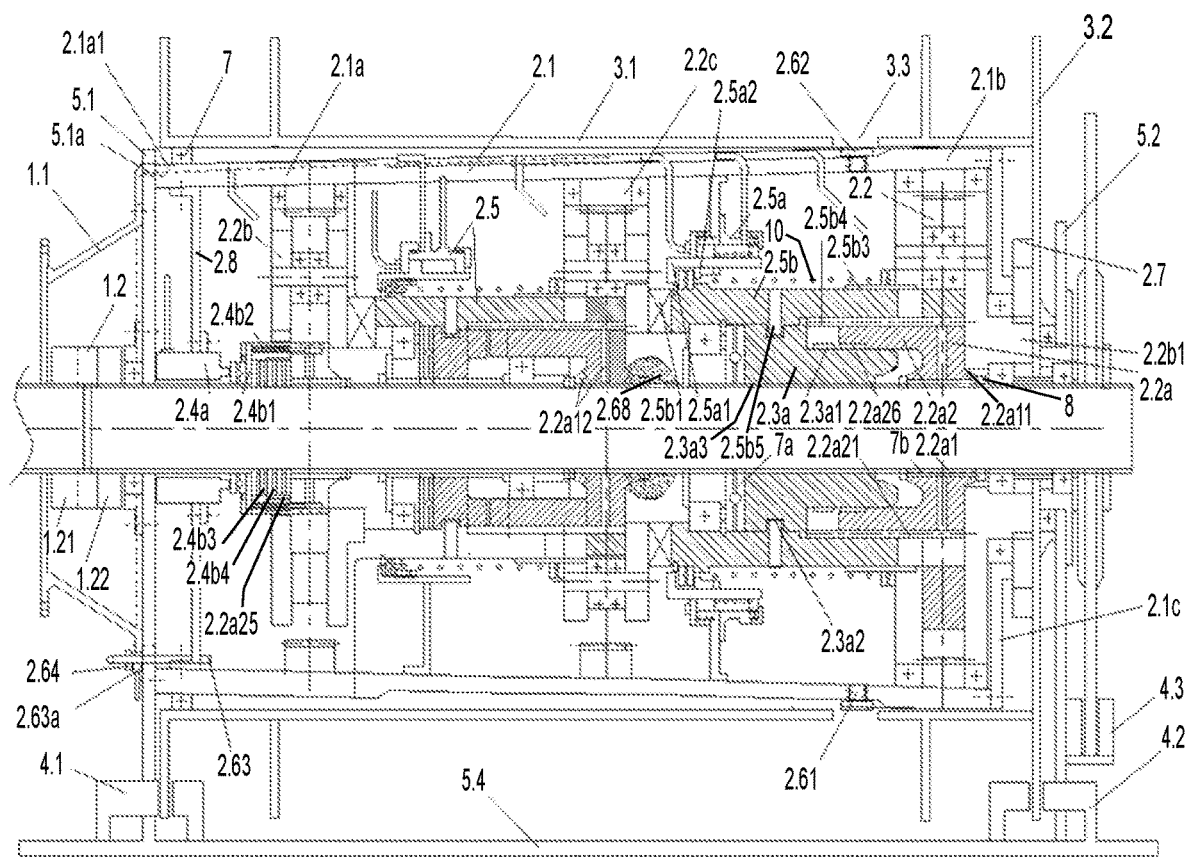
FIG. 2 is a schematic sectional view of the automatic shift transmission hoist in Embodiment 1.

The winch of FIG. 1 (a) to FIG. 2, which is equipped with an automatic-shifting planetary gear transmission, includes a power mechanism 1, a motor or a hydraulic motor, a transmission 2, a drum 3, a brake 4, a frame 5, and a sensor 6. The power mechanism 1 is connected to a left frame 5.1 via a knuckle 1.1 and the transmission 2 is disposed inside the drum 3. A tapered or cylindrical reinforcing section I 2.1 *a* is arranged on the left outer diameter of the transmission housing 2.1 with the tapered inner diameter and is connected with the frame 5.1 through bolts. A reinforcing section II 2.1 *b* is arranged on the right side. The outer diameter of the reinforcing section II 2.1 *b* is larger than that of the left strong section I 2.1 *a*, and a right end cover 2.1 *c* is fixed on the end surface of the reinforcing section II through bolts. A bearing 7 is arranged in the center hole of the right end cover 2.1 *c* and is combined with the n-stage planetary gear overhead output shaft 2.2 *b*1. A driving shaft 2.3 provided with an external spline penetrates through a central hole 2.2 *a*1 of a central sun gear of each planetary gear. The left side of the driving shaft 2.3 is fixed on a rack 5.1 through a bearing 7, and the left end part of the driving shaft 2.3 is connected with a motor or a hydraulic motor of the power mechanism 1 through a coupler 1.2 capable of freely rotating a driving shaft power output gear by a pitch p angle. The right side is combined with the inner diameter of the n-stage planetary gear overhead output shaft 2.2 b1 through a bearing 7 with inner splines in the inner ring. The end part is fixed in a hollow support frame 5.2 a on a rack 5.2 through the bearing 7.

The inner diameter of the left side of the winding drum 3 is provided with a bearing 7 to be combined with the reinforcing section I 2.1 a. The right end cover 3.2 is connected with the rope winding part drum body 3.1 through bolts, and the center hole of the right end cover is provided with a bearing 7 to be combined with a hollow support frame 5.2 a fixed on a rack 5.1, and the rack 5.2 is connected with a rack transverse assembly 5.3 and a base 5.4 through bolts.

A clutch I 2.4 is arranged on the left side of the first-stage planetary gear, and the clutch is divided into a normally combined type and a normally open type. A clutch gear shifter 2.5 is arranged between the 1-n planetary gears, and a clutch gear shifter execution unit tubular member 2.5 b sleeved on the driving shaft in neutral transmits the torque of the left planetary gear carrier 2.2 b to the central sun gear 2.2 a of the right planetary gear. A half coupling 2.7 capable of freely rotating by an angle alpha is arranged between the n-stage planetary gear carrier 2.2 b and the winding drum 3. The angle alpha is multiplied by the angle that the n-stage planetary gear transmission ratio i gt=one tooth pitch p of the left clutch II 2.5 b1, so that gear shifting is easy and free. The power mechanism 1 drives the 1-stage planetary gear to the n-stage planetary gear to decelerate step by step through the power output gear 2.3 a of the driving shaft, and the hollow output shaft 2.2 b1 of the n-stage planetary gear carrier drives the winding drum 3 to rotate, lift and overload. A driving unit II 2.5 a of a light-load or no-load n-stage planetary gear left clutch shifter drives an actuating unit tubular member 2.5 b to move to the right. A left clutch II 2.5 b 1 is disengaged, and a driving shaft power output gear 2.3 a positioned in the tubular member 2.5 b is combined with an n-stage planetary gear central sun gear 2.2 a. The driving shaft drives the n-stage planetary gear to perform single-stage speed reduction and then drives the winding drum 3 to rotate. The transmission principle of the n−1 stage planetary gear, the n−2 stage planetary gear and other stages planetary gear is the same. The gear shifting principle is that the winding drum 3 is braked firstly, the left clutch I of an original combined gear is combined and then a new gear is changed.

Figure 7:
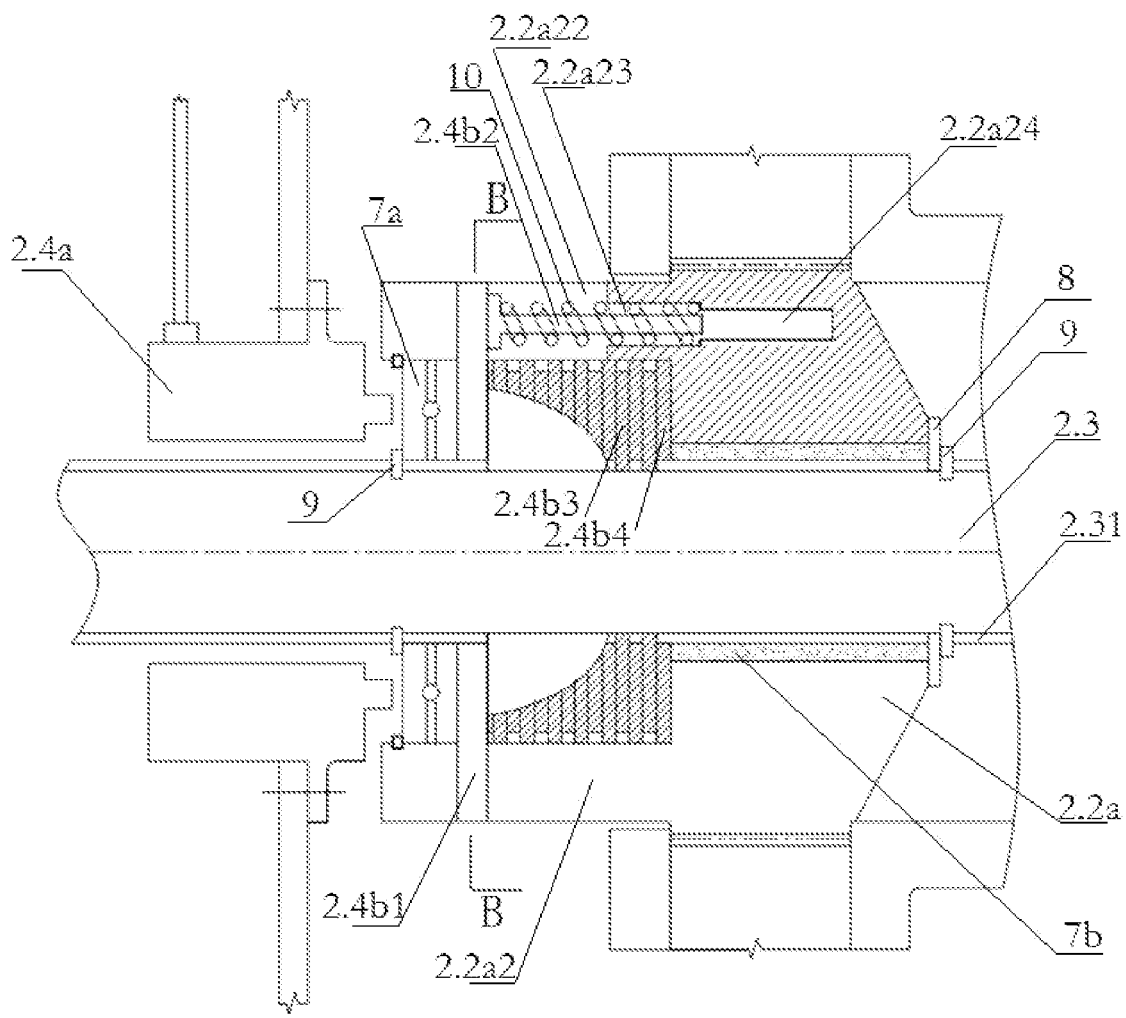
FIG. 7 (a) is a schematic view of a normally open friction plate clutch of the clutch I in Embodiment 1.
Figure 7:
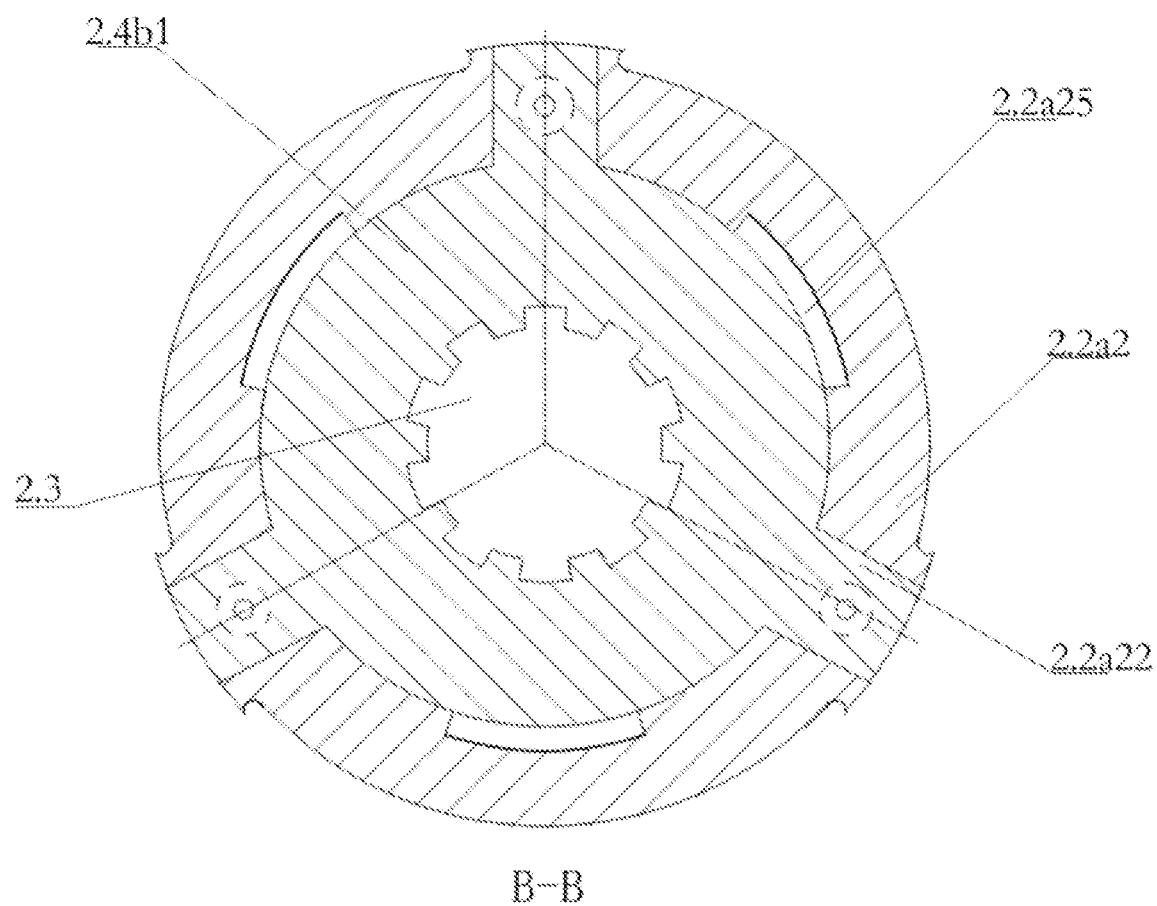

FIG. 2, FIG. 7 (*a*) and FIG. 7 (*b*) are schematic views of a normally open friction plate type clutch of a clutch I. A normally open friction plate type clutch 2.4 is arranged on the left side of a first-stage planetary gear. A normal hydraulic oil pressure is digitally displayed on a display screen of an external pressure sensor 6.3 of a transmission. An indicator light is turned on below a set value, and an alarm gives an alarm. Or the displacement sensor 6.2 on the sensor support 6.1 is connected with a programmable automatic control.

A clutch gear shifter 2.5 is arranged between the 1-n stage planetary gears, and two sets of displacement sensors 6.2 are symmetrically arranged left and right in the axial direction. A left No. 1 sensor 6.2 is used for normally displaying that a neutral position indicator lamp is turned on. The indicator lamp is turned off after the clutch is separated. The execution unit tubular member 2.5 b reaches a right dead point, and the left No. 2 sensor 6.2 is switched on. A power mechanism contactor coil is switched on while the present gear position indicator lamp is turned on. When the gear operation is completed, the new gear is required to be changed, the driving unit II 2.5 a is unloaded, the clutch shifter execution unit tubular member 2.5 b moves to the left side to be combined with the clutch under the action of the driving unit II 2.5 a and the spring force, the left No. 2 sensor 6.2 enables the gear indicating lamp to be turned off. The left No. 1 sensor 6.2 turns on the neutral indicating lamp and the new gear driving unit II 2.5 a turns on for automatic gear shifting. Manual control electric gear shifting displays the load weight according to a display screen. Gear shifting is carried out according to the economical lifting weight range of each gear, and automatic gear shifting can be realized by adopting microcomputer control according to pre-calculated data programming.

Figure 3:
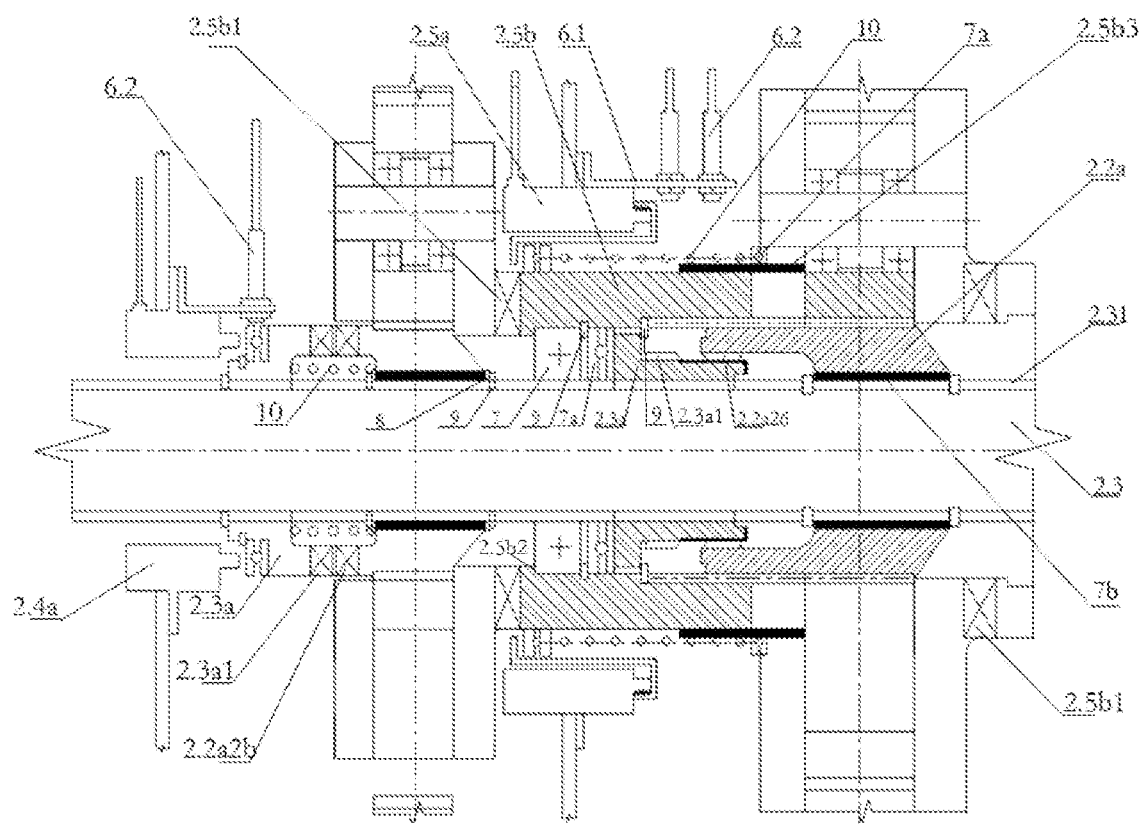
FIG. 3 (a) is a schematic diagram of a clutch shifter with free stroke and clutch I dog tooth engagement according to embodiments 1 and 4.
Figure 3:
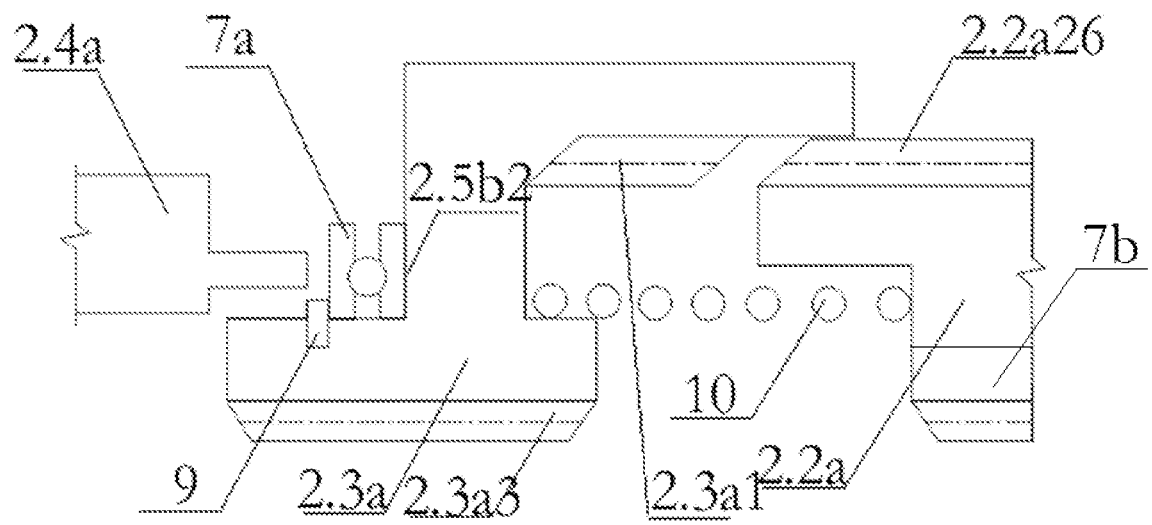
Figure 3:
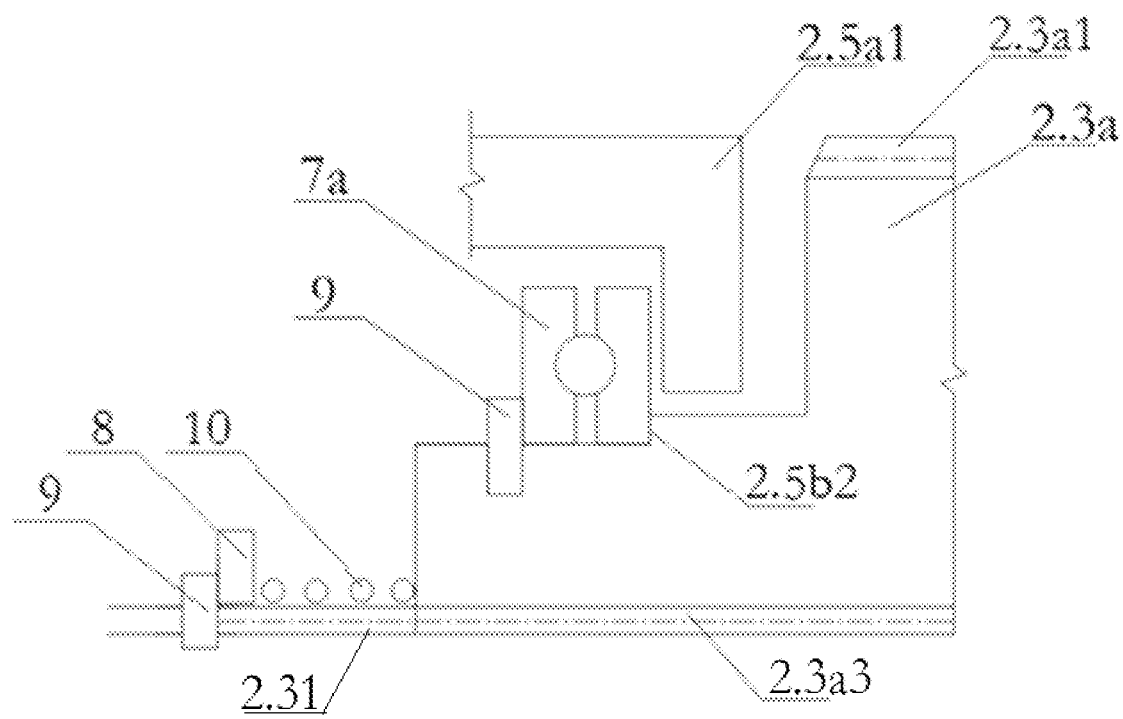

FIG. 3 (*a*) is a schematic diagram of a clutch shifter with free stroke. When the hollow single-acting spring reset type driving unit II 2.5 a is adopted, the clutch shifter execution unit tubular member 2.5 b is reset by means of a spring. The teeth of the clutch 2.5 b1 are not correspondingly and can not be completely combined. The driving shaft power output gear 2.3 a can not be completely separated from the central sun gear, and when the free stroke is added to make the teeth of the clutch contact, the right hand driving shaft power output gear 2.3 a is completely separate from the central sun gear. When the clutch 2.5 b1 is not fully engaged in contact, the new gear can directly drive the planetary gears to the reel 3 to rotate on the right side of the new gear. The new gear is on the left side of the present gear. When the new gear rotates, the planetary gear carrier 2.2 b is driven to rotate, and the clutch teeth are engaged under the action of spring force at the corresponding moment. When the bidirectional driving unit II 2.5 a is adopted, the clutch shifter execution unit tubular member 2.5 b can be pushed to move to the left to enable the clutch II to be combined, so that the free stroke can be reduced to a proper clearance.

Example 2

Figure 4:
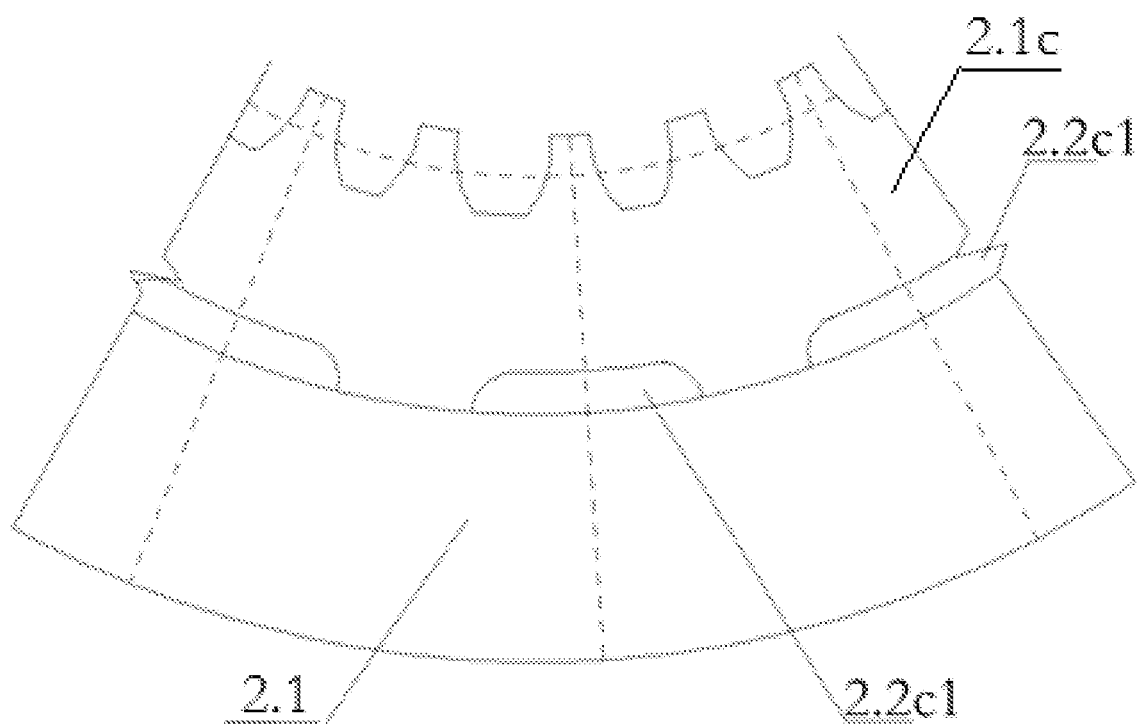
FIG. 4 is a schematic view of the oil discharge hole of the outer ring gear of the planetary gear in Embodiment 2.
Figure 5:
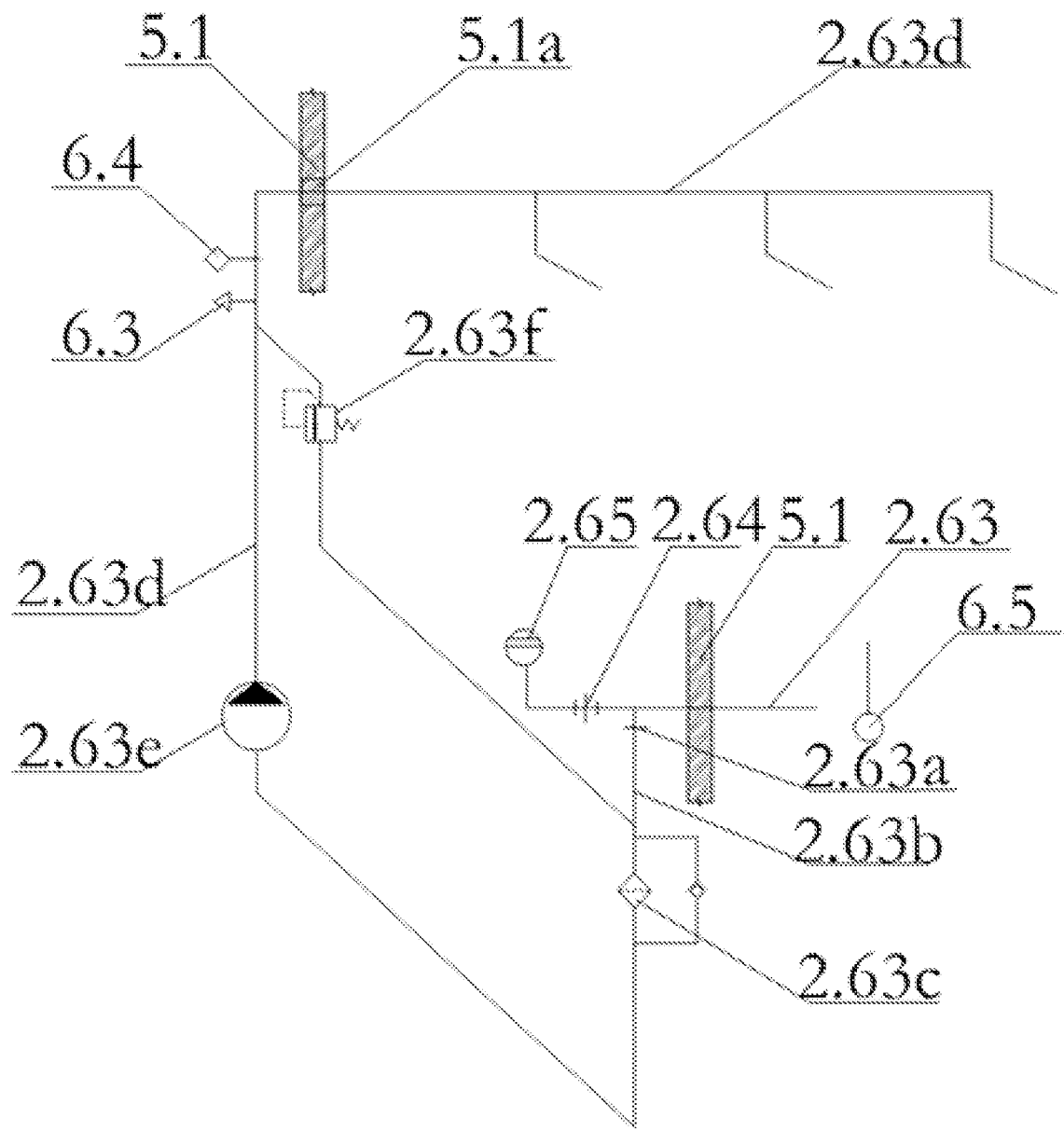
FIG. 5 is a schematic view of the planetary gear external circulation lubrication system in Example 2.

FIG. 1 (*a*), FIG. 1 (*b*) and FIG. 2 are general structure diagrams of a winch. FIG. 4 and FIG. 5 are schematic diagrams of a gear ring oil drainage hole and an external circulation lubricating system. The internal self-lubrication comprises a central sun gear and a lubricating oil through hole 2.2 a 12 arranged in the radial direction of a slope foot. An oil retaining material 2.68 is arranged between the right side of the central sun gear 2.2 a and an execution unit 2.4 b. In order to prevent the poor lubrication of the central sun gear bearing 7a of the left planetary gear caused by the long-time operation of the selected gear, an oil suction pipe 2.63 b is installed at a hollow pipe joint 2.63 a of an oil inlet and outlet pipe from the left side and connected with a hydraulic oil pump 2.63 e through an oil filter 2.63 c with a bypass. An overflow valve 2.63 f and a pressure sensor 6.3 are arranged on a lubricating oil pipe 2.63 d. The oil leaked from the flow sensor 6.4 and the overflow valve 2.63 f circulates through an oil pipe to an oil filter 2.63 c. A lubricating oil pipe 2.63 d is introduced into the upper part of a transmission shell 2.1 through a rack hole 5.1 a and a transmission shell axial groove 2.1 a1. A lubricating oil branch pipe enters the transmission from a hole in the upper part between planetary gears of all stages to directly lubricate the bearing of a central sun gear 2.2 a. The hydraulic pump is controlled by the PLC to stop rotating when the first-stage planetary gear works, and oil can be supplied and lubricated intermittently in other time periods.

The oil inlet and outlet pipe 2.63 is connected with the oil exchange pipe 2.65 with the T-shaped visual liquid level height through a loose joint or a quick joint 2.64. The upper half part of the oil exchange pipe 2.65 is provided with a positioning clamp 2.66 to fix the oil exchange pipe 2.65 on the rack 5.1, and the upper end and the lower end of the oil exchange pipe 2.65 are blocked by an end cover 2.67 with threads. An oil drainage hole 2.2 c1 is formed in the lower half part of the outer gear ring. An oil drainage hole 2.61 is formed in the bottom of the right side of the transmission shell with the tapered inner diameter. A breather and oiling hole 2.62 is formed in the top part corresponding to the oil drainage hole 2.61. An oil change hole 3.3 is formed in the position, corresponding to the oil drainage hole 2.61 and the breather and oiling hole 2.62, of the winding drum 3. The bottom of the right side of the tapered transmission housing is provided with an oil drain hole 2.61 so that oil can be completely replaced.

Example 3

Figure 6:
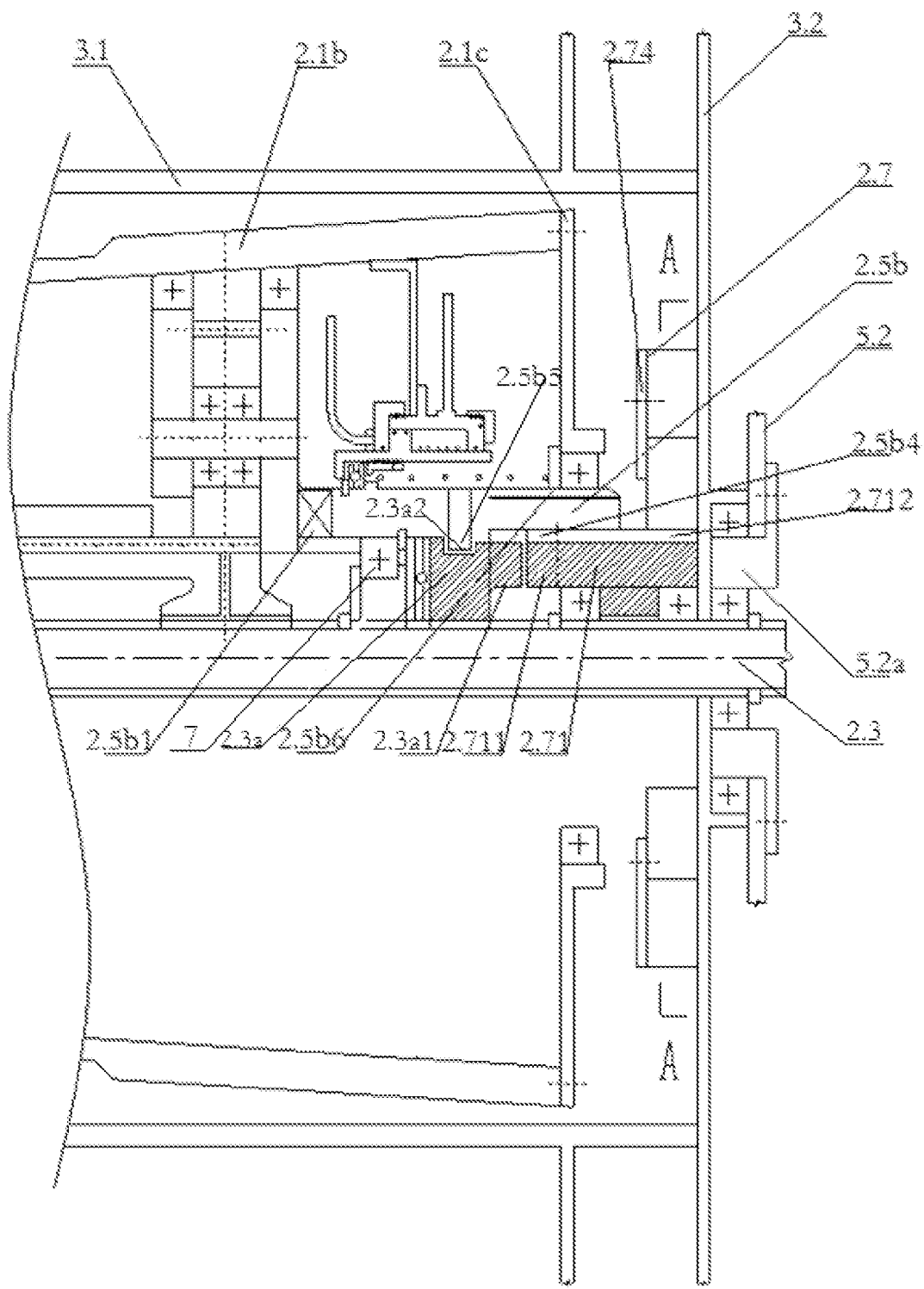
FIG. 6 (a) is a schematic view showing the arrangement of the clutch shifter between the n-stage planetary gear and the drum in Embodiment 3.
Figure 6:
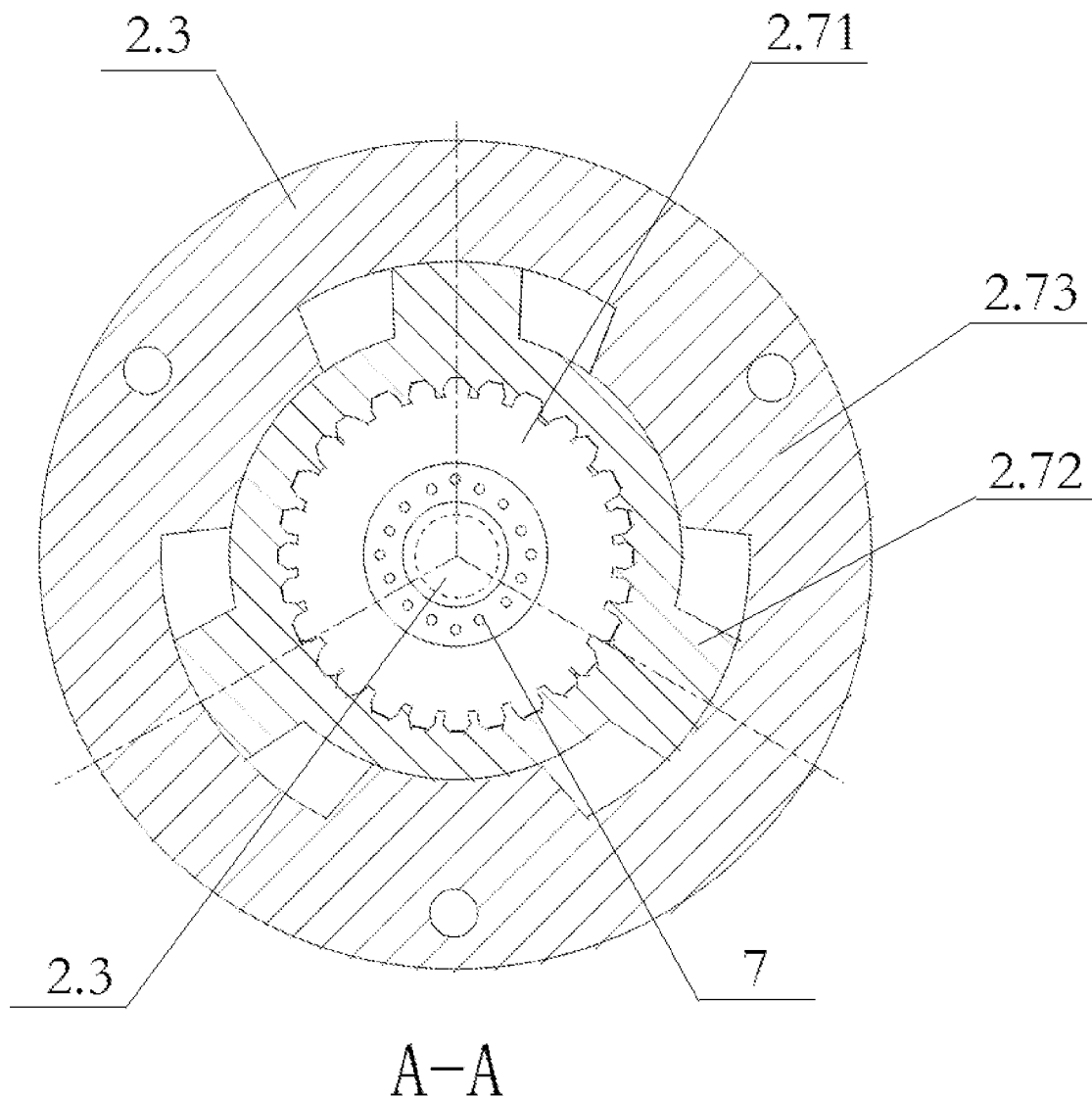

FIGS. 6 (a) and 6 (b) are schematic views showing that a clutch shifter is arranged between an n-stage planetary gear and a winding drum. An outer spline 2.5 b6 is arranged on the outer diameter of an clutch shifter execution unit tubular member 2.5 b of the clutch shifter. The outer spline 2.5 b6 is combined with an inner spline of an inner ring of a right end cover bearing 7 of the transmission and can slide axially. The outer spline 2.5 b6 is also connected with a sliding bearing and can slide axially. The right side spline 2.5 b4 of the tubular part is combined with the outer spline 2.712 of the central tubular part of the semi-coupling and can slide axially. The right side outer spline 2.712 of the central tubular part of the semi-coupling is in interference combination with the inner spline of the driving part 2.72 of the semi-coupling, and tooth cog III 2.711 arranged at the end of the left side is in dynamic combination with the tooth form or tooth cog I 2.3 a1 of the power output gear. A bearing with two inner rings provided with inner splines is combined with an outer spline 2.31 of the driving shaft. A semi-coupling pressing plate 2.74 positioned on a semi-coupling driven member 2.73 limits the axial movement of the driving member 2.72, and a lateral clearance between the semi-coupling driving member 2.72 and the driven member 2.73 is increased so that the clutch shifter execution unit tubular member 2.5 b can freely rotate by an angle alpha. The angle alpha is multiplied by the angle that the transmission ratio i of the n-level planetary gear is larger than or equal to the angle of one tooth pitch p of the execution unit clutch II, so that clutch gear shifting is facilitated. A gear shift instruction driving unit 2.5 a drives a clutch shifter execution unit tubular member 2.5 b to move to the right, a left clutch II 2.5 b1 is separated, a tooth form or tooth cog I 2.3 a1 of a driving shaft power output gear positioned in the clutch shifter execution unit tubular member 2.5 b on the right is combined with a tooth form or tooth cog III 2.711 corresponding to a central tubular piece of a half coupling. A power mechanism 1 directly drives a winding drum 3 to rotate through a driving shaft 2.3.

Example 4

FIG. 3 (a) is a schematic view of a normally open clutch I. The jaw clutch I is separated under the action of a spring 110. The driving shaft power output gear 2.3 a idles along with the driving shaft 2.3, and the driving unit I 2.4 a pushes the thrust bearing 7a to move the tooth form or the cog I 2.3 a1 of the driving shaft power output gear to the right side to be combined with the tooth form or the cog II 2.2 a26 of the annular shaft extension end face. The displacement sensor 6.2 is an inductive proximity switch conduction gear indicating lamp. The power mechanism 1 is switched on, and the central sun wheel is driven by the driving shaft to gradually decelerate to drive the winding drum to rotate. FIG. 3 (b) is a schematic view showing the combination of the outer teeth of the central sun gear and the inner teeth of the power take-off gear of the driving shaft. The driving unit 2.4 a drives the thrust bearing 7a so that the tooth profile or cog I 2.3 a 1 of the power take-off gear of the driving shaft is combined with the tooth profile or cog II 2.2 a 26 of the extended end face of the annular shaft. An electromagnetic valve oil return bypass opening driving unit 2.4 a with an external gear shift command moves to the left under the action of an inner spring and a spring 110, and a driving shaft power output gear 2.3 a and a central sun gear 2.2 a are separated under the pushing of the spring 110. FIG. 3 (c) is a schematic view of a normally-engaged clutch, in which a spring 10 is installed on the left side of a power take-off gear of a driving shaft, and the power take-off gear of the driving shaft is engaged with a central sun gear by being pushed by the spring A shift command driving unit 2.4 a pulls a thrust bearing 7a so that the power take-off gear of the driving shaft 2.3 a is separated from the central sun gear 2.2 a.

Example 5

Figure 8:
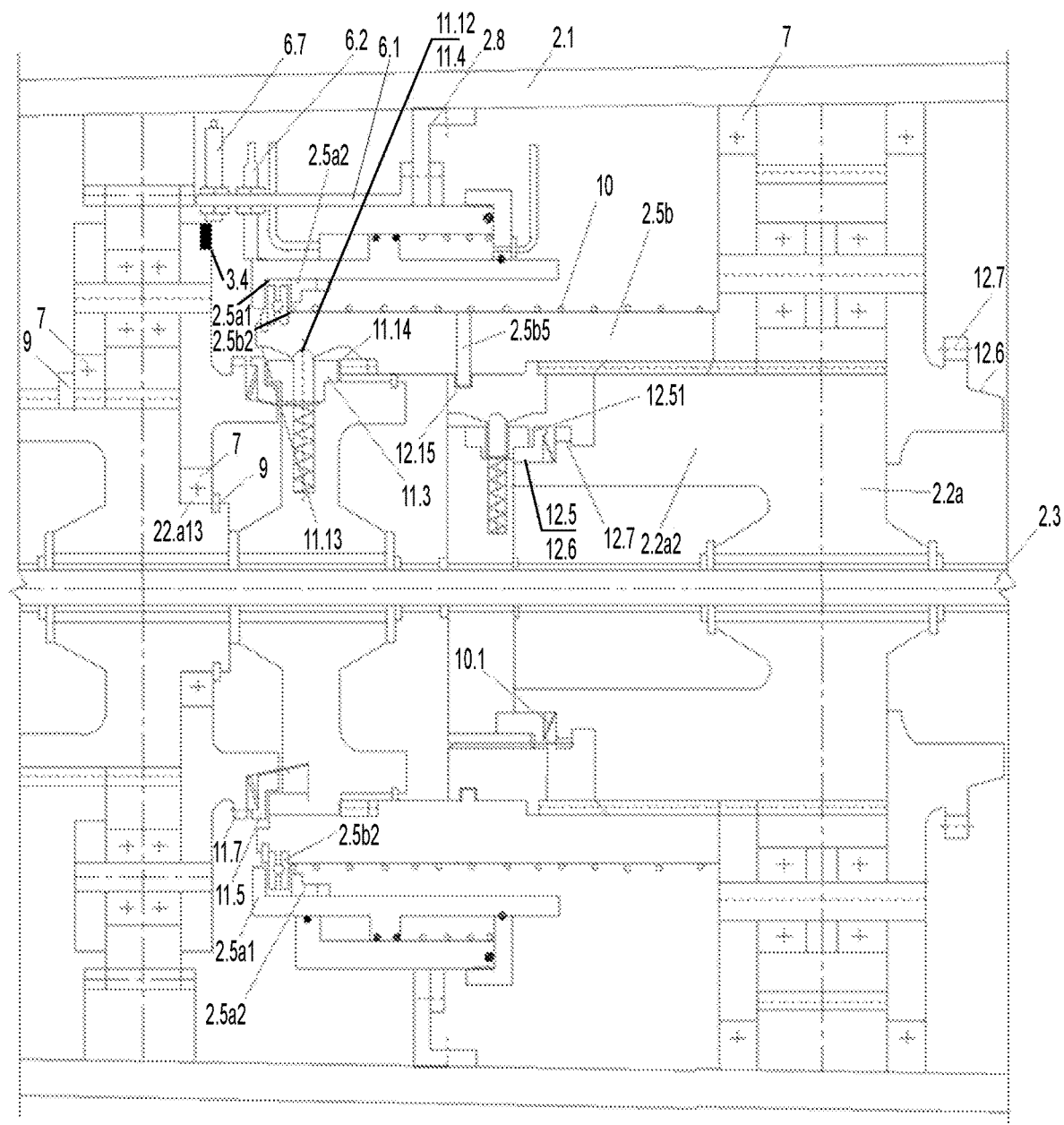
FIG. 8 (a) is a schematic view showing that synchronizers are provided on the right sides of 1-n planetary gears and n planetary gears of the transmission in Embodiment 5.
Figure 8:
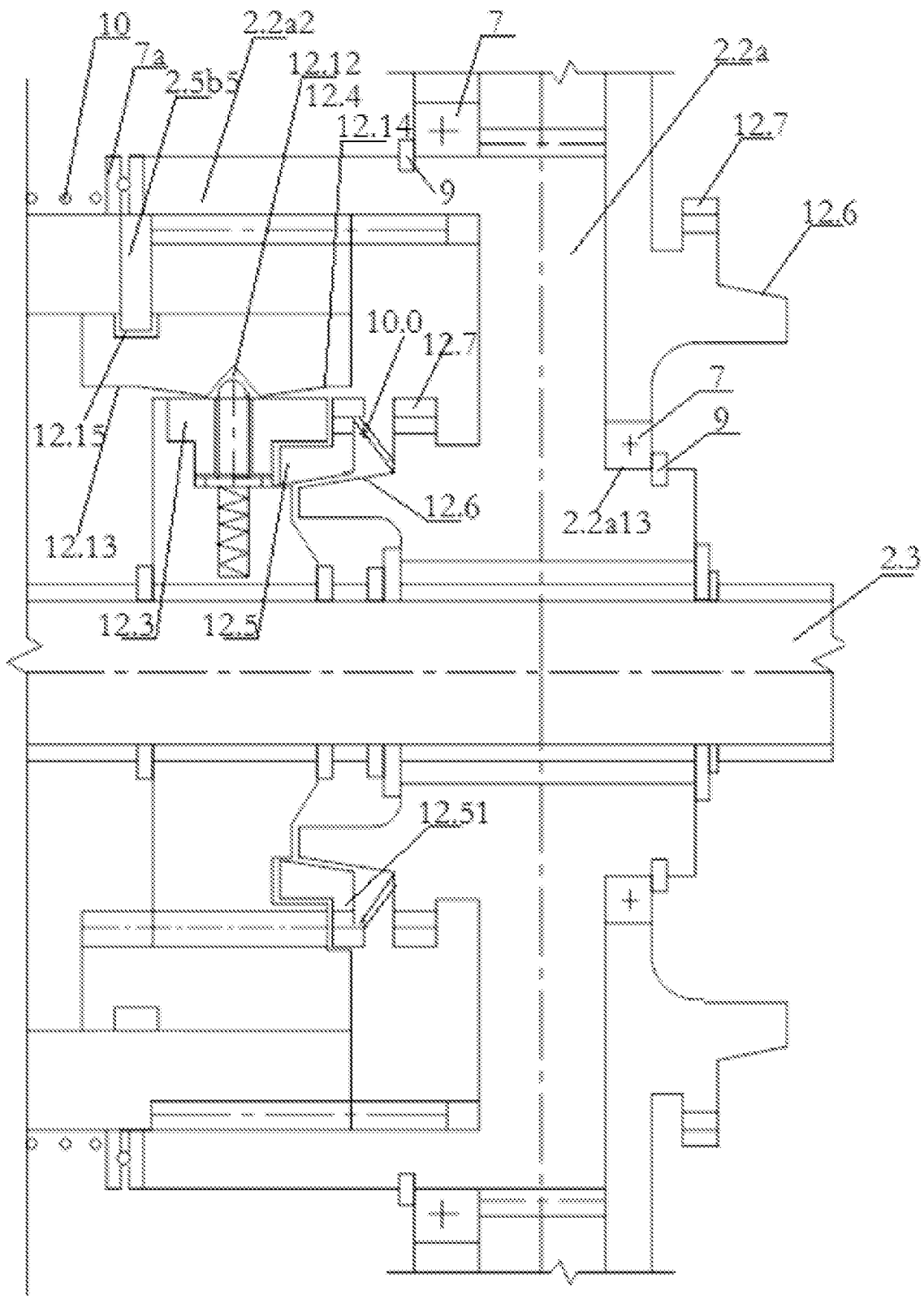
Figure 8:
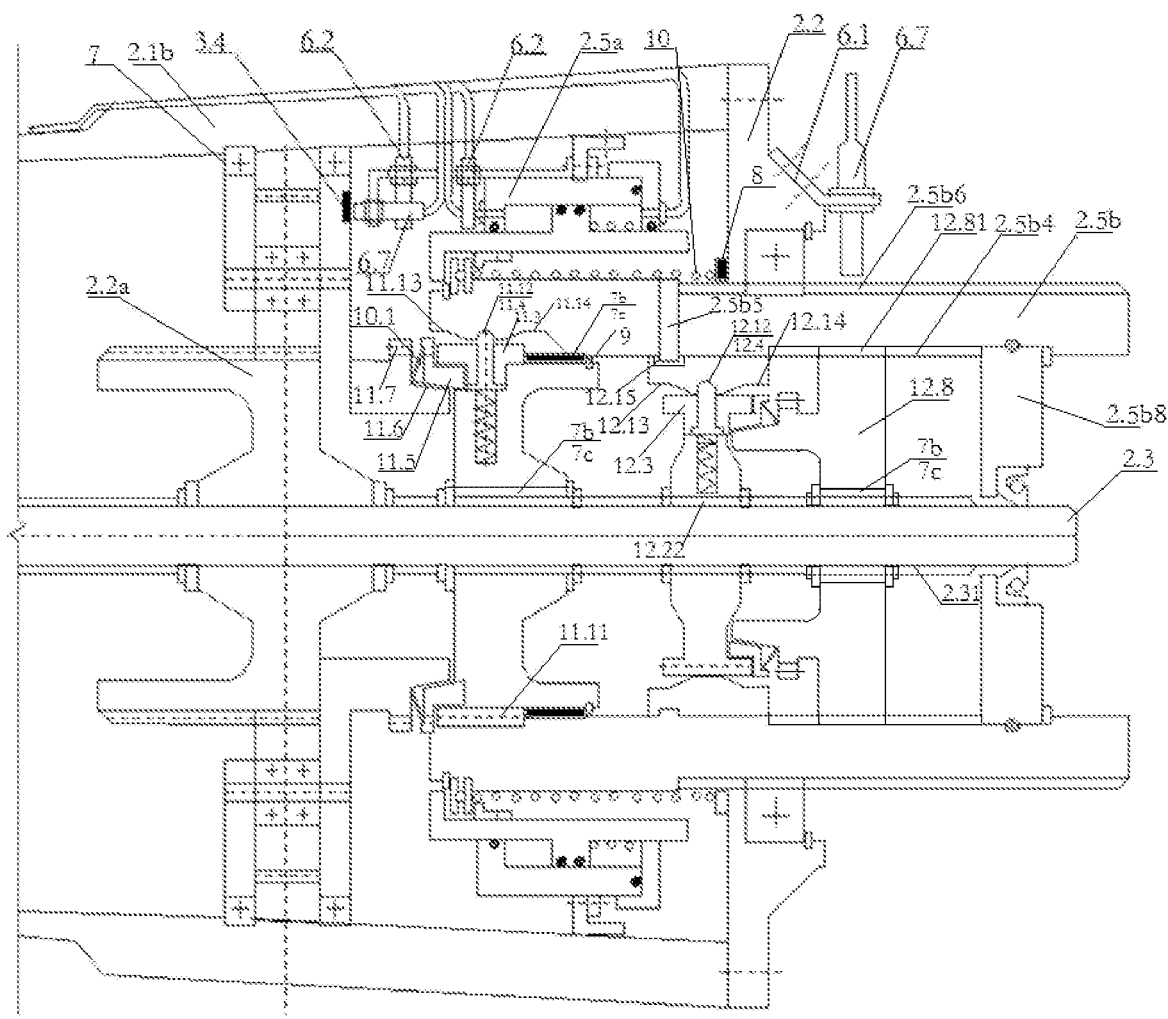

FIG. 8 (a) is a schematic view showing that the synchronizer is provided on the right side of the 1-n planetary gears and the n planetary gears of the transmission in Embodiment 5. FIG. 8 (b) is a schematic view showing that the engaging ring gear is provided on the left end face of the central sun gear of the transmission in Embodiment 5, and the drive unit II 2.5 a of the transmission 2 drives the clutch shifter execution unit tubular member 2.5 b to move to the left side. The middle groove I 11.12 formed in the inner diameter of the joint sleeve I on the left side of the clutch shifter execution unit tubular member 2.5 b drives the positioning pin I 11.4 and the sliding block I 11.3 to push the locking ring I 11.5 to be combined with the conical surface I arranged on the planetary gear carrier. The sharp angle of the inner tooth 11.11 formed in the inner diameter of the left side of the tubular piece 2.5 b contacts with the sharp angle of the locking ring 11.5 and continues to apply force. After the rotation speed of the clutch shifter execution unit tubular member 2.5 b is synchronized with the rotation speed of the planetary carrier 2.2 b, the inner teeth 11.11 of the engaging sleeve I are completely engaged with the engaging gear ring I 11.7, and at the same time, the positioning pin 2.5 b5 of the tubular member 2.5 b drives the engaging sleeve II 12.1 of the synchronizer II to move the synchronizer II 12 to the left to separate. The positioning pin I 11.4 and the positioning pin II 12.4 of the synchronizer II fall into the left slope foot 11.13 of the groove I and the left slope foot 12.13 of the groove II to be locked, and the left planetary gear carrier 2.2 b drives the tubular member 2.5 b and the right central sun gear 2.2 a in spline connection with the tubular member to rotate to transmit torque. The inner teeth 11.11 of the joint sleeve I on the left side of the tubular part are meshed with the outer teeth 11.21 of the spline hub I to drive the spline hub I to idle around the driving shaft 2.3 through the bearing 7, and the inner spline 12.22 of the spline hub II of the synchronizer, which is arranged on the inner diameter of the tubular part on the right side, is meshed with the spline 2.31 of the driving shaft. The outer teeth 12.21 of the spline hub II are meshed with the inner teeth 12.15 of the joint sleeve, and the outer diameter of the joint sleeve 12.11 and the inner.

Furthermore, a displacement sensor 6.2 is arranged on a sensor support 6.1 on the left side of the driving unit 2.5 a.

A permanent magnet 3.4 is arranged on each stage of planetary gear carrier 2.2 *b* and corresponds to the position of a rotation speed sensor 6.7. The displacement sensor 6.2 and the rotation speed sensor 6.7 are connected with a transmission controller TCU, and the transmission controller TCU and the motor controller MCU are controlled by the vehicle control unit VCU of the electric automobile and send out instructions according to output torque and accelerator feedback information. The original combination gear is on the right side of the new gear, and the original combination gear driving unit 2.5 *a* drives the clutch shifter execution unit tubular member 2.5 *b* to move leftwards to a neutral gear position displacement sensor 6.2 the new gear driving unit II 2.5 *a* is connected to drive the clutch shifter execution unit tubular member 2.5 *b* to move to the right side, and the synchronizer II is combined. The motor drives the driving shaft 2.3 to rotate so that the planetary gear carrier 2.2 *b* and the original combined gear tubular member 2.5 *b* rotate speed synchronous driving unit 2.5 *a* drives the clutch shifter execution unit tubular member 2.5 *b* to combine the synchronizer I, and the driving shaft 2.3 drives the new gear central sun gear to the hollow output shaft to output torque. The original combined gear is on the left side of the new gear, and the original combined gear driving unit 2.5 *a* drives the clutch shifter execution unit tubular member 2.5 *b* to move leftwards to a neutral gear position. The displacement sensor 6.2 conducts the driving unit to suspend movement, and the new gear driving unit 2.5 *a* conducts the tubular member to drive the tubular member to move rightwards. The synchronizer II is combined, and the motor drives the new gear driving shaft 2.3 to rotate to the hollow output shaft 2.2 *b*1 to output torque. The drive unit 2.5 *a* drives the clutch shifter execution unit tubular member 2.5 *b* to move the synchronizer I left when the original combination shift tubular member 2.5 *b* stops or nearly stops rotating.

Furthermore, the outer diameter of the planetary gear carrier 2.2 *b* of the transmission 2 is not provided with a bearing 7 which is combined with the transmission shell 2.1. The left end face of the annular shaft extension 2.2 *a*2 of the central sun gear is provided with a bearing 7 which is connected with a gear ring II 12.7 and a conical surface II 12.6. The central hole of the planetary gear carrier left sheet is provided with an inner ring inner spline. The bearing 7 is combined with the annular shaft extension spline, and the left side of the central sun gear annular shaft extension 2.2 *a*2 is limited by an elastic. The inner diameter of the right plate of the planetary gear carrier 2.2 *b* is provided with a bearing 7 which is combined with a conical slope foot plane 2.2 *a* 13 on the right side of the central sun gear to eliminate radial runout, and the right side of the bearing 7 is provided with an elastic retainer ring 9 for limiting.

Further, according to FIG. 8 (*b*), the outer spline of the right side spline 2.5 *b*4 of the tubular member of the coupling ring gear II 12.7 and the conical surface II 12.6 which are arranged in the left axial direction from the end face of the central sun gear 2.2 *a* is combined with the inner spline of the annular shaft extension spline 2.2 *a* 21 of the central sun gear and is axially slidable. The inner diameter of the left plate of the planet gear carrier 2.2 *b* is provided with a bearing 7 which is combined with the outer diameter of the annular shaft extension 2.2 *a*2 of the central sun gear, and the left side of the planet gear carrier 2.2 *b* is limited by an elastic retainer ring 9. The inner diameter of the right plate of the planetary gear carrier 2.2 *b* is provided with a bearing 7 which is combined with the right side slope foot plane 2.2 *a* 13 of the central sun gear, and the right side of the planetary gear carrier 2.2 *b* is provided with an elastic retainer ring 9 for limiting, so that radial runout caused by gear combination clearance is eliminated.

Further, a butterfly spring 10.1 is provided between the lock ring of the synchronizer I or the synchronizer II and the engagement ring gear to separate the lock rings 11.5 and 12.5 from the tapered surfaces 11.6 and 12.6. The outer diameter of the butterfly spring 10.1 is in contact with the lock ring recessed steps 11.51 and 12.51, and the inner diameter is in contact with the intersection of the tapered surfaces 11.6 and 12.6 and the engagement ring gears 11.7 and 12.7 vertical surfaces. The three-cone synchronizer is arranged in a mode that middle steel ring convex claws are connected with the joint gear rings 11.7 and 12.7. The outer diameter of the butterfly spring 10.1 is in contact with the lock ring I 11.5 or the lock ring II 12.5 side concave steps, and the inner diameter of the butterfly spring 10.1 is in contact with the intersection of the middle steel ring and the joint gear rings 11.7 and 12.7 vertical surfaces.

Furthermore, a synchronizer II follower 12.8 is arranged on the right side of the spline hub II, and a joint gear ring II 12.7 and a conical surface II 12.6 are arranged on the left side of the synchronizer II follower 12.8. A bearing 7*c* or 7*b* arranged in a central hole is combined with the driving shaft 2.3. Wear-resistant material washers 8 are arranged on two sides of the synchronizer II follower 12.8, and an elastic retainer ring 9 is limited. An external spline 12.81 is arranged on the outer diameter of the synchronizer II follower 12.8, and the synchronizer II follower 12.8 and the conical surface IIA tubular member 2.5 *b* is arranged on the right side of the n-stage planet gear carrier 2.2 *b* and serves as a hollow output shaft 2.2 *b*1. A driving unit 2.5 *a* drives the tubular member 2.5 *b* to move the synchronizer I to be combined to the left side, and the hollow output shaft 2.2 *b*1 outputs the rotation speed and the torque of the n-stage planet gear 2.2 and the planet gears on the left side of the n-stage planet gear 2.2 at different reduction ratios. When the driving unit drives the tubular member to move the left synchronizer I to the right to separate, the locking ring of the right synchronizer II is combined with the conical surface II 12.6 on the left side of the follower 12.8 of the synchronizer II. The joint sleeve is meshed with the joint gear ring after rotating speed synchronization, and the motor directly drives the hollow output shaft 2.2 *b*1 through the driving shaft 2.3 to output at the rotating speed and the torque of 1:1.

The power mechanism of the present invention is a solid shaft motor or a hydraulic motor, which is different from the prior application of invention patent 201710471350 X "A planetary gear transmission with automatic shifting and speed changing and a winch equipped with the transmission"(which has been renamed as "a winch equipped with a planetary gear transmission with automatic shifting and speed changing" in China). The external gear shifting mechanism is removed to shorten the axial size, and the clutch and the gear shifting mechanism are combined into a whole. The power connection with the power input side is cut off during gear shifting, the mechanical friction is reduced, and the device is suitable for a tower crane, a port crane or a mobile crane and commonly used large-stroke traction lifting equipment. The synchronizer arranged in the clutch shifting transmission can be used as a transmission for light-load mechanisms such as electric automobiles and the like, and can be popularized due to the fact that the clutch shifting transmission is simple in structure and convenient to shift.

While the foregoing is directed to embodiments of the present invention, other and further embodiments of the invention may be devised without departing from the basic scope thereof, and the scope thereof is determined by the claims that follow.

The invention claimed is:

1. A winch provided with an automatic shifting planetary gear transmission comprises a power mechanism motor or a hydraulic motor (1), a transmission (2), a winding drum (3), a brake (4), a rack (5) and a sensor (6), and is characterized in that a flange at the end of the power mechanism (1) is fixed on a left rack (5.1) through a joint (1.1) by bolts;

the transmission (2) is arranged in the winding drum (3), conical or cylindrical reinforcing sections I (2.1 *a*) and II (2.1 *b*) are arranged on the outer diameters of the two sides of a transmission shell (2.1) with the tapered inner diameter, the outer diameter of the left reinforcing section I (2.1 *a*) is smaller than that of the right reinforcing section II (2.1 *b*), and the left end face of the transmission shell (2.1) is fixed on the rack (5.1) through bolts, a plurality of axial grooves (2.1 *a*1) are formed in the upper half part of the reinforcing section I (2.1 *a*), oil pipes for gear shifting and lubricating and strong and weak electric lines enter the lead-out transmission shell (2.1) from the axial grooves (2.1 *a*1) through a rack hole (5.1 *a*), and a transmission right end cover (2.1 *c*) is fixed on the end face of the reinforcing section II (2.1 *b*) through bolts, a bearing (7) arranged in the central hole is combined with an n-stage planetary gear overhead output shaft (2.2 *b*1), a bearing (7) with an inner ring inner spline arranged on the inner diameter of a hollow output shaft (2.2 *b*1) is combined with a driving shaft outer spline (2.31), and a half coupling (2.7) is arranged between the hollow output shaft (2.2 *b*1) and a winding drum (3) for connection, a pressing plate (2.74) is arranged on the left end face of the half coupling (2.7), the gap between a half coupling driving member (2.72) and a driven member (2.73) is increased, so that the hollow output shaft (2.2 *b*1) can freely rotate by an angle alpha, and the angle alpha is multiplied by the angle alpha of one tooth pitch p of an n-stage planetary gear (2.2) transmission ratio i gt=n-stage planetary gear left clutch II (2.5 *b*1);

a bearing (7) arranged on the inner diameter of the left side of the winding drum (3) is combined with the outer diameter of a transmission shell reinforcing section I (2.1 *a*), a right end cover (3.2) of the winding drum is connected with a rope winding part drum body (3.1) through bolts, a bearing (7) arranged on the center hole of the right end cover (3.2) of the winding drum is combined with a right hollow support frame (5.2 *a*), and the hollow support frame (5.2 *a*) is fixed on a right rack (5.2), the right rack (5.2) is bolted to a frame cross member (5.3) and a base (5.4);

a driving shaft (2.3) provided with external splines penetrates through central holes (2.2 *a*1) of each central sun gear, a bearing (7) arranged on the left side is installed on a rack (5.1), a bearing (7) arranged on the right side is installed in a hollow support frame (5.2 *a*), and a coupler (1.2) arranged at the end part of the left side is connected with a power mechanism (1), The clearance between a coupling driving part (1.21) and a coupling driven part (1.22) is increased, so that the driving shaft can freely rotate by more than or equal to the angle of one pitch p of a driving shaft power output gear (2.3 *a*);

a clutch I (2.4) and a displacement sensor (6.2) are arranged on the left side of a first-stage planetary gear (2.2) of the transmission (2);

a clutch gear shifter (2.5) is arranged between each planetary gear (2.2), and a planetary gear carrier (2.2 *b*) on the left side is connected with a central sun gear (2.2 *a*) on the right side through a clutch gear shifter execution unit tubular member (2.5 *b*), a gear clutch shifter drive unit II (2.5 *a*) selected by the gear shift command drives a clutch shifter execution unit tubular member (2.5 *b*) sleeved on a driving shaft to move to the right, a left clutch II (2.5 *b*1) is separated, and a driving shaft power output gear (2.3 *a*) positioned in the clutch shifter execution unit tubular member (2.5 *b*) on the right is combined with a right central sun gear (2.2 *a*), a power mechanism (1) drives a selected gear central sun gear (2.2 *a*) to an n-stage planetary gear carrier (2.2 *b*) through a driving shaft (2.3) to drive a winding drum (3) to rotate, a displacement sensor (6.2) is arranged between each stage of planetary gear (2.2) and connected with a programmable logic controller (PLC), the PLC controls an indicator lamp and an alarm, receives and sends out instructions, and the automatic gear shifting is completed through programming control.

2. The winch according to claim 1, wherein the clutch I (2.4) is provided with a limit groove on the driving shaft from the left side, a limit elastic check ring (9), a wear-resistant material washer (8), a driving shaft power output gear (2.3 *a*) of a thrust bearing (7*a*) on the left shoulder (2.5 *b*2), and a spring (10), the device comprises a limiting elastic retainer ring (9), a wear-resistant material washer (8), a central sun gear (2.2 *a*), a wear-resistant material washer (8), a limiting elastic retainer ring (9) and a clutch I (2.4), wherein the limiting elastic retainer ring (9), the wear-resistant material washer (8), the wear-resistant material washer (8), the limiting elastic retainer ring (9) and the clutch I (2.4) are in a normally combined type, and a spring (10) is arranged on the left side of a driving shaft, the power output gear is provided with teeth or cogs I (2.3 *a*1) combined with corresponding teeth or cogs II (2.2 *a*26) on the left side of the central sun gear (2.2 *a*), and the drive unit I (2.4 *a*) pushes or pulls the thrust bearing (7*a*) to combine or separate the clutch I (2.4), two sets of displacement sensors (6.2) are symmetrically arranged left and right in the axial direction on a sensor support (6.1), the displacement sensors (6.2) are connected with the PLC, the sensor support (6.1) and the clutch driving unit I (2.4 *a*) are fixed on an annular support frame (2.8), and the annular support frame (2.8) is fixed in the transmission shell (2.1) through bolts;

when the driving unit I (2.4 *a*) is a spring return type hollow shaft hydraulic cylinder or a pneumatic cylinder, a normally open type multi-plate friction clutch can be arranged, a limiting elastic retainer ring (9) and a thrust bearing (7*a*) are sequentially arranged on the left side of the driving shaft (2.3), and an elastic retainer ring (9) is arranged on the inner diameter of a central sun wheel annular shaft extension (2.2 *a*2), a pin (2.4 *b*2) is inserted into the spring (10) and compressed into a pin hole (2.2 *a*24), and the end cap outer diameter of the pin hole (2.2 *a*24) is equal to the outer diameter of the spring (10), an inner spline of a driving piece (2.4 *b*3) is combined with an outer spline (2.31) of the driving shaft, an outer spline or convex claw of a driven piece (2.4 *b*4) is combined with an annular shaft extending inner spline or groove (2.2 *a*25), the planetary gear central sun gear (2.2 *a*), the wear-resistant material washer (8) and the limiting elastic retainer ring (9) are combined, a drive unit I (2.4 *a*) directly drives the thrust bearing (7*a*) to enable the clutch to be combined, and a pressure sensor (6.3) is arranged in an external solenoid valve outlet pipeline of the drive unit I (2.4 *a*).

3. The winch according to claim 1, wherein the clutch gear shifter comprises a driving unit II (2.5 *a*) and an actuating unit II (2.5 *b*), and the driving unit II (2.5 *a*) adopts a hollow shaft spring return type bidirectional or unidirectional power type hydraulic cylinder or pneumatic cylinder, a hollow shaft spring reset type electromagnetic pulling switch or a cylindrical plurality of electromagnetic pulling switches can also be adopted; annular pull claws and push claws (2.5 *a*1, 2.5 *a*2) are arranged at the two sides of the thrust bearing (7*a*) at the end part and the inner diameter of the hollow shaft, when a plurality of cylindrical electromagnetic pull switches are adopted, the circular pull claws (2.5 *a*3) are arranged, and a certain gap is kept between the pull claws, the push claws and the thrust bearing (7*a*) when in neutral; two sets of displacement sensors (6.2) are symmetrically arranged in the axial direction of a sensor support (6.1), the sensor support (6.1) and a driving unit II (2.5 *a*) are arranged on a circular ring-shaped support (2.8), and the circular ring-shaped support (2.8) is fixed in a transmission shell (2.1) through bolts.

4. The winch according to claim 3, wherein a thrust bearing (7*a*) is installed on an outer diameter of a left side of the clutch shifter execution unit tubular member (2.5 *b*) with a shoulder (2.5 *b*2), a left side of the thrust bearing is positioned by a stopper ring (9), and one end of the spring (10) is in contact with a right side of the thrust bearing (7*a*), and the other end of the clutch shifter execution unit tubular member (2.5 *b*) is in contact with a thrust bearing (7*a*) sleeved on a wear-resistant annular member (2.5 *b*3) and embedded on the right planetary gear carrier, the left end of the clutch shifter execution unit tubular member (2.5 *b*) and the end of the planetary gear carrier are arranged in a tooth-embedded mode, and a gear type clutch II (2.5 *b*1) and a right spline (2.5 *b*4) arranged on the clutch shifter execution unit tubular member are meshed with an annular shaft extension spline (2.2 *a*21) and can slide axially, the inner diameter is provided with an inner shaft shoulder (2.5 *b*2) from the left side, a bearing (7) with an inner spline on the inner ring, a limiting elastic retainer ring (9), a thrust bearing (7*a*), a driving shaft power output gear (2.3 *a*) and a limiting elastic retainer ring (9), a driving shaft power output gear adopts an end face tooth form or a tooth cog I (2.3 *a*1) to be meshed with a central sun gear left tooth form or a tooth cog II (2.2 *a*26), a positioning pin (2.5 *b*5) is radially arranged on a tubular part (2.5 *b*), and the positioning pin (2.5 *b*5) is inserted into a power output gear outer diameter ring groove (2.3 *a*2) for positioning;

the inner spline (2.3 *a*3) of the power output gear of the driving shaft is meshed with the outer spline (2.31) of the driving shaft and can slide axially, the driving unit II (2.5 *a*) drives the clutch shifter execution unit tubular member (2.5 *b*) to move to the right, and the tooth profile or cog I (2.3 *a*1) and the left tooth profile or cog II (2.2 *a*26) of the central sun gear are combined for gear shifting, when the tubular member (2.5 *b*) moves into engagement or contact with the left clutch II (2.5 *b*1) under the drive of the spring force or the driving unit II (2.5 *a*), the driving shaft power output gear (2.3 *a*) is separated from the central sun gear and idles along with the drive shaft (2.3);

the length of the annular shaft extension spline (2.2*a*21) on the left side of the central sun gear is greater than or equal to the structural engagement length of the right side spline (2.5 *b*4) of the tubular member plus the engagement length of the clutch II (2.5 *b*1) and the total stroke length of the driving shaft power output gear (2.3 *a*), tooth shapes or tooth cogs II (2.2 *a*26) are arranged inside or on the end face and are combined with tooth shapes or tooth cogs I (2.3 *a*1) of the power output gear of the driving shaft, conical slope feet (2.2 *a*11) are arranged on the right side or two sides, and lubricating oil through holes (2.2 *a*12) are uniformly distributed in the central radial direction of the central sun gear and the radial direction of the conical slope feet (2.2 *a*11), an oil-retaining material (2.68) is arranged between the conical slope foot (2.2 *a*11) and the tubular part (2.5 *b*) in a space manner, a needle bearing (7*c*) with an inner ring inner spline engaged with an outer spline of the driving shaft or a sliding bearing (7*b*) with an inner spline engaged with the outer spline of the driving shaft is arranged between the inner diameter of the central sun gear central hole (2.2 *a*1) and the driving shaft, and the sliding bearing (7*b*) can also be installed in a floating manner, wear-resistant material gaskets (8) are arranged on the left side and the right side, and the outer side is positioned by limiting elastic check rings (9) arranged on the driving shaft.

5. The winch according to claim 1, wherein the driving shaft power output gear (2.3 *a*) positioned in the clutch shifter execution unit tubular member (2.5 *b*) of a clutch shifter actuator unit has a free stroke between a tooth form or cog I (2.3 *a*1) and a central sun gear form or cog II (2.2 *a*26), the length of the free stroke is greater than the engagement length of the clutch II (2.5 *b*1) or the engagement length of the driving shaft power output gear (2.3 *a*) and the central sun gear (2.2 *a*), and the size of the free stroke is two larger; the use of the bi-directional drive unit II (2.5 *a*) reduces the free stroke to the appropriate clearance.

6. The winch according to claim 1, wherein in a lubricating system (2.6), oil discharge holes (2.2 *c*1) are uniformly formed at intervals in the lower half of the outer diameters of the planetary gear rings (2.2 *c*) of each stage in the transmission shell having a tapered inner diameter, notches with equal heights on two sides with equal arcs and equal heights are axially cut out from the outer diameter of an outer gear ring (2.2 *c*) to serve as oil drainage holes (2.2 *c*1), oil drainage holes (2.61) are arranged at the bottom of the right side of a transmission shell (2.1), a breather and oil filling hole (2.62) is arranged at the top corresponding to the oil drainage holes, and a reel (3) and the oil drainage holes (2.61) are arranged, oil change holes (3.3) are arranged at positions corresponding to the breather and oil filling holes (2.62);

an oil exchange pipe (2.65) with a visible oil level height is arranged at the bottom of the power mechanism (1) at the end part of the left rack (5.1), the oil exchange pipe (2.65) is arc-shaped and equidistantly arranged along the outer diameter of the transition joint (1.1), and a short pipe arranged in an axial T shape of the oil exchange pipe (2.65) is connected with an oil inlet and outlet pipe (2.63) led out from the machine body through a loose joint or a quick joint (2.64), a positioning clamp (2.66) is arranged at the upper part and fixed on the rack (5.1), and end covers (2.67) with threads are arranged at the upper end and the lower end of the rack (5.1) for plugging;

a hollow joint (2.63 *a*) is arranged at the bottom of an oil inlet/outlet pipe (2.63) led out from the machine body, an oil suction pipe (2.63 *b*) is connected with the hollow joint (2.63 *a*) and is connected with a hydraulic pump (2.63 *e*) through an oil filter (2.63 *c*) with a bypass, and an overflow valve (2.63 *f*) is arranged on a lubricating oil pipe (2.63 *d*) connected with the hydraulic pump (2.63 *e*), a pressure sensor (6.3), a flow sensor (6.4) and an overflow valve (2.63 *f*) directly discharge overflow oil to an oil suction pipe (2.63 *b*) for circulation, and a lubricating oil pipe (2.63 *d*) enters the upper part of a transmission shell (2.1) through a rack hole (5.1 *a*) and an axial groove (2.1 *a*1), the central sun gear sliding bearing (7*b*) and the clutch shifter execution unit tubular member inner bearing (7) are directly lubricated by entering the transmission shell (2.1) through holes arranged between planetary gears of all stages;

an oil level sensor (6.5) is disposed within the tapered transmission shell (2.1).

7. The winch according to claim 1, wherein a clutch shifter (2.5) is provided between the n-stage planetary carrier (2.2 *b*) and the drum (3), and the outer diameter of the clutch shifter execution unit tubular member (2.5 *b*) is provided with an outer spline (2.5 *b*6) combined with a bearing, which is combined with an inner spline of an inner ring of a right end cap bearing (7) of the winch and is axially slidable, or a sliding bearing (7*b*) is arranged between the outer diameter of the clutch shifter execution unit tubular member (2.5 *b*) and the bearing of the right end cover of the transmission, so that the clutch shifter execution unit tubular member (2.5 *b*) can axially slide, and a tooth form or tooth cog III (2.711) is arranged on the left side of a central tubular member (2.71) of the half coupling and is dynamically combined with a tooth form or tooth cog I (2.3 *a*1) of the power output gear of the driving shaft, the left side of the outer spline (2.712) of the central tubular member is meshed with the right side spline (2.5 *b*4) of the clutch shifter execution unit tubular member and can axially slide, the right side is meshed with the inner spline of the half coupling driving member (2.72), and the bearing (7) with two inner ring inner splines arranged on the inner diameter is combined with the driving shaft (2.3), a pressing plate (2.74) is arranged on the left side of the driven member (2.73) to limit the axial movement of the driving member (2.72), and a gap between the half coupling driving member (2.72) and the driven member (2.73) is increased to enable the clutch shifter execution unit tubular member (2.5 *b*) to freely rotate by an angle alpha, wherein the angle alpha is multiplied by an n-stage planetary gear transmission ratio i which is equal to or larger than an angle of one tooth pitch p of the left clutch II (2.5 *b*1), a follower is bolted to the center of the right end cap of the drum 3.

8. The winch according to claim 1, wherein each of the two ends of the drum (3) is provided with a brake (4) including a normally closed brake (4.1) and a normally open brake (4.2); a driving shaft normally-open brake (4.3) is arranged at the extending end part of the right shaft of the driving shaft (2.3);

and the end cover of the winding drum (3) is provided with a permanent magnet, concave-convex teeth or a grating (3.4), and the rack (5) is provided with a turn number sensor (6.6) for detecting the number of turns of the winding drum in the positive and negative directions and controlling the upper and lower limit positions of the lifting hook; a rotation speed sensor (6.7) is arranged to detect the rotation speed of the winding drum, and when the rotation speed of the winding drum reaches or exceeds a set value, the microcomputer and the PLC automatically control the winding drum normally-open brake (4.2) and the driving shaft normally-open brake (4.3) to brake.

9. The winch according to claim 1, wherein the clutch I (2.4) and the clutch shifter (2.5) are in a neutral position by pressing a special hook lowering switch when the hook is lowered, and the power mechanism (1) rotates a normally closed brake (4.1) to release the brake, the empty hook of the winding drum (3) can rapidly descend under the control of a winding drum normally-open brake (4.2), and the power mechanism (1) stops rotating and normally-closed brake (4.1) brakes;

in the lifting hook descending process, a first-gear multi-disc friction clutch I (2.4) is connected with a power mechanism (1), a motor is used for regenerative electric braking, or a hydraulic motor is connected for assisting braking by means of a motor brake, hydraulic system throttling speed regulation, volume speed regulation and the like, and the winding drum normally-open brake (4.2) and a driving shaft normally-open brake (4.3) are braked under manual control or automatic control; the sensor (6) is fixed on the rack (5) and connected with the microcomputer and the PLC.

10. The winch of claim 1, wherein the clutch shifter execution unit tubular member (2.5 *b*) of the transmission (2) is provided with a synchronizer I (11) on the left side and a synchronizer II (12) on the right side, in a normal state, torque of a synchronizer I combined with a left planet gear carrier (2.2 *b*) is transmitted to a right central sun gear (2.2 *a*) through a pipe (2.5 *b*), an inner hole (11.22) of a spline hub I of the synchronizer I is provided with a needle bearing (7*c*) or a sliding bearing (7*b*), an inner ring spline of the needle bearing (7*c*) is meshed with an outer spline of a driving shaft, and the sliding bearing (7*b*) can also be installed in a floating mode, a bearing (7*b* or 7*c*) is arranged on the outer diameter of the right annular shaft of the spline hub I (11.2) and is combined with the inner diameter of the clutch shifter execution unit tubular member (2.5 *b*), a wear-resistant material gasket (8) and an elastic retainer ring (9) are arranged on two sides of the spline hub I on the driving shaft for limiting, and the spline hub II inner spline (12.22) of the synchronizer II is meshed with the driving shaft outer spline (2.31), elastic retaining rings (9) are arranged on the two sides of a spline hub II on the driving shaft for limiting;

an inner tooth (11.11) arranged on the left side of the tubular member (2.5 *b*) as the inner diameter of a joint sleeve I (11.1) is engaged with an outer tooth (11.21) of the spline hub I, the inner tooth is slidably engaged with an outer tooth of a lock ring I (11.5) and a joint gear ring I (11.7), and a middle groove I (11.12) and left and right slope feet I (11.13) of the groove I are arranged at the position of a sliding block I (11.3, 11.14) is respectively combined with a positioning pin (11.4), a shaft shoulder is arranged on the outer diameter of the positioning pin (11.4) to mount a thrust bearing (7*a*), an elastic retainer ring (9) is arranged on the left side of the thrust bearing to limit the axial displacement of the thrust bearing, the left side of a spring (10) is in contact with the thrust bearing (7*a*), and the right side of the spring (10) is in contact with a thrust bearing (7*a*) or a wear-resistant material washer (8) on the left side of the planetary a positioning pin (2.5 *b*5) at the right half part of the tubular piece is inserted into a joint sleeve II annular groove (12.15) arranged in the tubular piece, a right side spline (2.5 *b*4) of the clutch shifter execution unit tubular member is combined with a central sun gear annular shaft extension spline (2.2 *a*21), and the length of the right side spline (2.5 *b*4) is larger than or equal to the total stroke length of the synchronizer I and the synchronizer II and is calculated by a structure;

a joint gear ring I (11.7), a conical surface I (11.6), a butterfly spring (10.1) connected with the conical surface I, a locking ring I (11.5) and a spline hub I (11.2) are arranged at the right axial direction of a central hole of a right sheet of the planetary gear carrier (2.2 *b*);

a joint gear ring II (12.7), a conical surface II (12.6), a butterfly spring (10.1) connected with the conical surface II, a locking ring II (12.5), a spline hub II (12.2) and internal teeth (12.15) of a joint sleeve II are normally meshed with external teeth (12.21) of the spline hub II and can axially slide, and the outer teeth of the lock ring II (12.5) and an engaging gear ring II (12.7) are slidably combined;

a displacement sensor (6.2) is arranged on a sensor support (6.1) on the left side of the gear clutch shifter drive unit II (2.5 *a*), a permanent magnet (3.4) is arranged on each stage of planetary gear carrier (2.2 *b*) and corresponds to a rotation speed sensor (6.7) in position, and the displacement sensor (6.2) and the rotation speed sensor (6.7) are connected with a transmission controller TCU, the transmission controller TCU and the motor controller MCU are controlled by a vehicle control unit (VCU) of the electric automobile, an instruction is sent according to output torque and accelerator feedback information, the original gear clutch shifter drive unit II (2.5 *a*) drives the tubular member (2.5 *b*) to move leftwards to a neutral gear position, and the synchronizer II delayed to a new gear is combined with the synchronizer I.

11. The winch of claim 10, wherein the transmission carrier (2.2 *b*) has an outer diameter in which no bearing (7) is provided in combination with the transmission shell (2.1), and a coupling ring gear II (12.7) is provided to the left from the left end face of a central sun gear ring-shaped shaft extension (2.2 *a2*), and in the conical surface II (12.6), a bearing (7) with an inner ring inner spline arranged on the inner diameter of the left sheet of the planetary gear carrier (2.2 *b*) is combined with an annular shaft extension spline (2.2 *a21*), and an elastic retainer ring is arranged on the left side for limiting;

the left side end of the central sun gear (2.2 *a*) faces the left axial direction and is provided with a joint gear ring II (12.7), an external spline of a conical surface II (12.6) and a right side spline (2.5 *b4*) of the clutch shifter execution unit tubular member, and the external spline is combined with an internal spline of an annular shaft extension spline (2.2 *a21*) and can axially slide, a bearing (7) arranged on the inner diameter of a left sheet of the planetary gear carrier (2.2 *b*) is combined with the outer diameter of the central sun gear ring-shaped shaft extension (2.2 *a2*), and the left side of the planetary gear carrier (2.2 *b*) is limited by an elastic retainer ring (9);

a bearing (7) arranged on the inner diameter of the right sheet of the planetary gear carrier (2.2 *b*) is combined with a slope foot plane (2.2 *a13*) on the right side of the central sun gear, and an elastic retainer ring (9) is arranged on the right side for limiting;

a butterfly spring (10.1) is arranged between the lock ring and the joint gear ring of the synchronizer I or the synchronizer II, the outer diameter of the butterfly spring (10.1) is in contact with recessed steps (11.51, 12.51) on the side surfaces of the lock ring I and the lock ring II, and the inner diameter is in contact with the intersection of the conical surface and the vertical surface of the joint gear ring; a three-cone synchronizer is arranged in a mode that a middle steel ring convex claw is connected with a joint gear ring, the outer diameter of a butterfly spring (10.1) is in contact with concave steps (11.51 and 12.51) on the side surface of the lock ring, and the inner diameter is in contact with the intersection of the middle steel ring and the vertical surface of the joint gear ring.

12. The winch of claim 10, wherein a synchronizer I (11) is provided between the right plate of the n-stage planetary gear of the transmission (2) and the tubular member (2.5 *b*), and the clutch shifter execution unit tubular member (2.5 *b*) serves as a hollow power output shaft (2.2 *b1*) to directly output the rotation speed and torque of the left 1-n-stage planetary gear change;

an external spline I (2.5 *b6*) is arranged on the outer diameter of the right side of the clutch shifter execution unit tubular member (2.5 *b*) and is meshed with an internal spline of a center bearing (7) of a right end cover (2.1 *c*) of the transmission and can slide axially, and an optical axis is also arranged to be combined with a sliding bearing (7*a*) of the right end cover of the transmission and can slide axially; a connecting gear ring II (12.7) is arranged on the left side, a synchronizer II follower (12.8) with a conical surface II (12.6) is provided with a bearing (7*c* or 7*b*) with an inner ring and an inner spline, the bearing (7*c* or 7*b*) is combined with a driving shaft, wear-resistant material gaskets (8) are arranged on two sides, and an elastic retainer ring (9) is positioned on the driving shaft (2.3), the right spline (2.5 *b4*) of the clutch shifter execution unit tubular member is combined with the outer spline (12.81) of the follower of the synchronizer II and can slide axially; and an inner end cover (2.5 *b7*) is arranged on the right side of the tubular part and is positioned by an elastic retainer ring (9), and the optical axis part of the right end part of the driving shaft (2.3) without a spline is in contact with an oil seal of the inner end cover (2.5 *b7*); the gear clutch shifter drive unit II (2.5 *a*) drives the clutch shifter execution unit tubular member (2.5 *b*) to move the left synchronizer I (1) to the right side to separate, meanwhile, the joint sleeve II (12.1) of the right synchronizer II drives a positioning pin II (12.4), and a sliding block II (12.3) pushes the locking ring II (12.5) to be combined with the conical surface II (12.6), After the rotating speed of the driving shaft (2.3) and the rotating speed of the tubular member (2.5 *b*) are synchronized, the inner teeth (12.11) of the joint sleeve II are meshed with the joint gear ring II (12.7), the positioning pins (11.4 and 12.4) of the synchronizers I and II fall into the left slope feet (11.13 and 12.13) of the grooves I and II for locking, and the driving shaft (2.3) drives the tubular member (2.5 *b*) to directly output torque; a displacement sensor (6.2) and a rotating speed sensor (6.7) are arranged on a sensor support (6.1) on the left side of the gear clutch shifter drive unit II, and a rotating speed sensor (6.7) is arranged on a sensor support (6.1) on a transmission right end cover (2.2).

\* \* \* \* \*